US012783818B2

(12) United States Patent
Kotikalapudi et al.

(10) Patent No.: US 12,783,818 B2
(45) Date of Patent: Nov. 3, 2026

(54) REDUCING COMPUTATIONAL RESOURCE USAGE VIA TRAINING AND/OR UTILIZING LARGE LANGUAGE MODELS

(71) Applicant: GOOGLE LLC, Mountain View, CA (US)

(72) Inventors: Ragha Kotikalapudi, San Jose, CA (US); Chen Zhu, Palo Alto, CA (US); Steven Zheng, San Bruno, CA (US); Sahitya Potluri, Sunnyvale, CA (US); Yu Du, Sunnyvale, CA (US); Heng-Tze Cheng, Mountain View, CA (US); Quoc Le, Sunnyvale, CA (US); Ed H. Chi, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 269 days.

(21) Appl. No.: 18/231,650

(22) Filed: Aug. 8, 2023

(65) Prior Publication Data

US 2024/0378394 A1 Nov. 14, 2024

Related U.S. Application Data

(60) Provisional application No. 63/466,132, filed on May 12, 2023.

(51) Int. Cl.
*G06F 40/40* (2020.01)
*G06F 16/3329* (2025.01)
(Continued)

(52) U.S. Cl.
CPC .......... *G06F 40/40* (2020.01); *G06F 16/3329* (2019.01); *G06F 16/3344* (2019.01);
(Continued)

(58) Field of Classification Search
None
See application file for complete search history.

(56) References Cited

U.S. PATENT DOCUMENTS 10,978,056 B1 4/2021 Challa
11,586,814 B2 * 2/2023 Jiang .................... G06F 40/237
(Continued)

FOREIGN PATENT DOCUMENTS

WO 2020148355 A1 7/2020

OTHER PUBLICATIONS

Lianmin Zheng, Wei-Lin Chiang, Ying Sheng, Siyuan Zhuang, Zhanghao Wu, Yonghao Zhuang, Zi Lin, Zhuohan Li, Dacheng Li, Eric. P Xing, Hao Zhang, Joseph E. Gonzalez, Ion Stoica; Judging LLM-as-a-judge with MT-Bench and Chatbot Arena; Jul. 12, 2023; URL:https://arxiv.org/abs/2306.05685v2; (Year: 2023).*
(Continued)

*Primary Examiner* — Richa Sonifrank
(74) *Attorney, Agent, or Firm* — Gray Ice Higdon

(57) ABSTRACT

Implementations described herein relate to using self-evaluation when utilizing a large language model (LLM) to generate a response to a natural language (NL) based input. The LLM can be used to process the NL based input to generate a plurality of responses, and to generate a critique of those responses by comparing the responses to a set of response evaluation criteria. One of the responses can then be selected based on the comparison with the set of response evaluation criteria which can vary from one NL based input to another. If the NL based input was obtained a user of a client device during an inference stage, then the selected response can be rendered for presentation to the user. If the NL based input was obtained during a training stage, then the selected response can be stored as a training instance and optionally in association with additional data.

16 Claims, 12 Drawing Sheets

(51) Int. Cl.

| | |
|---|---|
| ***G06F 16/334*** | (2025.01) |
| ***G06F 16/338*** | (2019.01) |
| ***G06F 40/279*** | (2020.01) |
| ***G06F 40/30*** | (2020.01) |
| ***G06F 40/35*** | (2020.01) |
| ***G06F 40/56*** | (2020.01) |
| ***G06N 3/006*** | (2023.01) |
| ***G06N 3/045*** | (2023.01) |
| ***G06N 3/0475*** | (2023.01) |
| ***G06N 3/08*** | (2023.01) |
| ***G06N 3/09*** | (2023.01) |
| ***G06N 20/00*** | (2019.01) |
| ***G06N 20/20*** | (2019.01) |

(52) U.S. Cl.

CPC ............ *G06F 40/279* (2020.01); *G06F 40/30* (2020.01); *G06F 40/35* (2020.01); *G06F 40/56* (2020.01); *G06N 3/006* (2013.01); *G06N 3/045* (2023.01); *G06N 3/08* (2013.01); *G06N 3/09* (2023.01); *G06N 20/00* (2019.01); *G06F 16/338* (2019.01); *G06N 3/0475* (2023.01); *G06N 20/20* (2019.01)

(56) References Cited

U.S. PATENT DOCUMENTS

| | | | | |
|---|---|---|---|---|
| 11,645,479 | B1 * | 5/2023 | Coursey | G06F 40/58 704/9 |
| 12,468,898 | B2 * | 11/2025 | Imani | G06F 40/40 |
| 2022/0284049 | A1 | 9/2022 | Christensen | |
| 2023/0359789 | A1 * | 11/2023 | Andre | G06F 30/27 |
| 2024/0211685 | A1 * | 6/2024 | Plotkin | G06F 40/20 |
| 2024/0303421 | A1 * | 9/2024 | Fabian | G06F 40/40 |
| 2024/0346251 | A1 * | 10/2024 | Le | H04L 51/02 |
| 2024/0346254 | A1 * | 10/2024 | Liu | G06F 16/90332 |
| 2024/0362417 | A1 * | 10/2024 | Imani | G06F 40/30 |
| 2024/0378390 | A1 * | 11/2024 | Korganyan | G06F 11/3616 |

OTHER PUBLICATIONS

Aman Madaan, Niket Tandon, Prakhar Gupta, Skyler Hallinan, Luyu Gao, Sarah Wiegreffe, Uri Alon, Nouha Dziri, Shrimai Prabhumoye, Yiming Yang, Shashank Gupta, Bodhisattwa Prasad Majumder, Katherine Hermann, Sean Welleck, Amir Yazdanbakhsh, Peter Clark; (conti . . . V (nextpage) (Year: 2023).*

Jin Chen, Zheng Liu, Xu Huang, Chenwang Wu, Qi Liu, Gangwei Jiang, Yuanhao Pu, Yuxuan Lei, Xiaolong Chen, Xingmei Wang, Defu Lian, Enhong Chen; When Large Language Models Meet Personalization: Perspectives of Challenges and Opportunities; Jul. 31, 2023; URL: https://arxiv.org/pdf/2307.16376 (Year: 2023).*

Lei Wang, Wanyu Xu, Yihuai Lan, Zhigiang Hu, Yunshi Lan, Roy Ka-Wei Lee, Ee-Peng Lim; Plan-and-Solve Prompting: Improving Zero-Shot Chain-of-Thought Reasoning by Large Language Models; May 6, 2023; URL: https://arxiv.org/abs/2305.04091v1 (Year: 2023).*

Jason Wei, Xuezhi Wang, Dale Schuurmans, Maarten Bosma, Brian Ichter, Fei Xia, Ed Chi, Quoc Le, Denny Zhou; Chain-of-Thought Prompting Elicits Reasoning in Large Language Models; Jan. 10, 2023; URL: https://arxiv.org/abs/2201.11903 ( Year: 2023).*

Self-Refine: Iterative Refinement with Self-Feedback; May 25, 2023; URL: https://arxiv.org/pdf/2303.17651 (Year: 2023).*

Bowman, S.R. et al., “Measuring Progress on Scalable Oversight for Large Language Models”; Cornell University, arXiv.org; arXiv:2211.03540v2; 21 pages; dated Nov. 11, 2022.

Wang, Y. et al., “Self-Instruct: Aligning Language Models with Self-Generated Instructions”; Cornell University; arXiv.org; arXiv:2212.10560v2; 23 pages; dated May 25, 2023.

European Patent Office; International Search Report and Written Opinion issued in Application No. PCT/US2023/034818; 12 pages; dated Feb. 6, 2024.

* cited by examiner

500

REDUCING COMPUTATIONAL RESOURCE USAGE VIA TRAINING AND/OR UTILIZING LARGE LANGUAGE MODELS

BACKGROUND

Large language models (LLMs) are particular types of machine learning models that can perform various natural language processing (NLP) tasks, such as language generation, machine translation, and question-answering. These LLMs are typically trained on enormous amounts of diverse data including data from, but not limited to, webpages, electronic books, software code, electronic news articles, and machine translation data. Accordingly, these LLMs leverage the underlying data on which they were trained in performing these various NLP tasks. For instance, in performing a language generation task, these LLMs can process a natural language (NL) based input that is received from a client device, and generate an NL based output that is responsive to the NL based input and that is to be rendered at the client device.

In some cases, an LLM can include hundreds of millions of parameters, billions of parameters, or even one hundred billion or more parameters. As such, given the large numbers of parameters included in an LLM, performance of NLP tasks using an LLM can consume relatively large amounts of resources (e.g., in terms of computing resources used in completing the NLP task, time taken to complete performance of the NLP task, energy consumed for completion of the NLP task, etc.). Furthermore, again owing to the size of LLMs, it can be difficult to adequately train an LLM such that it can reliably perform a given NLP task according to that task's respective constraints, particularly when those constraints are not explicitly provided. It is therefore beneficial in terms of computational resource usage for LLMs to generate responses to NL based inputs that do not necessitate additional follow-up NL based inputs.

SUMMARY

Implementations described herein can serve to reduce the number of follow-up NL based inputs that may be received by an LLM. Although any given user may decide to provide a follow-up NL based input, any "on average" reduction in the number of follow-up NL based inputs can be hugely beneficial in terms of computational resource usage. More specifically, implementations described herein relate to using self-evaluation when utilizing a LLM to generate a response to a NL based input. The LLM can be used to process the NL based input to generate a plurality of responses, and to generate a critique of those responses by comparing the responses to a set of response evaluation criteria. One of the responses can then be selected as the "highest quality" response, based on the comparison with the set of response evaluation criteria which can vary from one NL based input to another. For instance, if the NL based input requests that the LLM generate a response that includes a fiction story for children, then the "highest quality" response may be one that includes simple words and sentences and that is short and engaging as set forth in the response evaluation criteria, and regardless of whether the fiction story is factually accurate. However, if the NL based input requests that the LLM generate a response that recounts a historical event, then the "highest quality" response may be one that is most factually accurate as set forth in the response evaluation criteria. Such techniques can result in responses being provided that reduce the number of follow-up NL based inputs, at least on average across the user base.

Since the LLM operates in a probabilistic manner, the quality of the initial, candidate, responses generated based on processing the NL based input using the LLM can vary. For instance, if an average of the quality of the candidate responses is taken, some of the candidate responses can be considered below the average quality and some can be considered above the average quality. By evaluating the quality of the candidate responses based on comparing them against a set of response evaluation criteria, the candidate response that is considered the highest quality can be identified.

As used herein, the "set of response evaluation criteria" can include constraints, guidelines, principles, quality metrics, rules, etc., which are implied or inherent to a particular NL based input and/or to a particular context. The set of response evaluation criteria can be used to determine an objective measure of quality of a response to an NL based input based on the extent to which (e.g., how many) the response complies with one or more criteria included in the set of response evaluation criteria. In other words, the set of response evaluation criteria for a particular NL based input can be indicative of attributes that should be exhibited by a response to that particular NL based input. It can be assumed that a likelihood of a given response resulting in follow-up NL based input(s) corresponds to the extent to which the response complies with the set of responses evaluation criteria.

In some implementations, at least some of the response evaluation criteria can be generated based on processing the NL based input using the same LLM used in generating the candidate responses and/or the critique of the candidate responses. For instance, implied constraints, quality metrics, etc. can be inferred by the LLM from attributes of the NL based input. This can be performed by providing a request, to the LLM, to generate a set of response evaluation criteria that is particular to the NL based input. In this way, the LLM can effectively self-evaluate its own responses according to criteria it itself generated in order to identify a "high-quality" response, without human intervention. In additional or alternative implementations, at least some of the response evaluation criteria can be obtained from data associated with a particular user of a client device. In additional or alternative implementations, at least some of the response evaluation criteria can be obtained from data associated with a third party (3P) that is associated with the particular user of the client device, such as a third party entity that is distinct from a first party entity that trains and/or manages the LLM.

As used herein, a "critique response" can be indicative of an evaluation of a corresponding one of the candidate responses according to the set of response evaluation criteria. For instance, a critique response can be generated for each of the candidate responses. This can be performed by providing a request, to the LLM, to determine which of one or more criteria included in the set of response evaluation criteria each candidate response complies with. In some implementations, each critique response can therefore provide an indication of an extent to which a corresponding one of the candidate replies complies with the response evaluation criteria. The candidate response which best complies with the evaluation criteria can then be identified based on the critique responses. In some implementations, the corresponding critique response associated with a given one of the candidate responses that indicates the given one of the candidate responses complies with the highest number of response evaluation criteria can be identified.

In some other implementations, multiple critique responses can be generated for each of the corresponding candidate responses, where each of the multiple critique responses for a given one of the corresponding candidate replies indicate an extent to which the given one of the candidate replies complies with the response evaluation criteria. In these implementations, a majority vote can be used to determine which of the candidate responses is most consistently determined to best comply with the set of response evaluation criteria. For instance, assume that 5 critique responses are generated for each of the corresponding candidate responses. In this instance, and assuming that 4 of the 5 critique responses (or some other majority) indicate that the given one of the corresponding candidate responses best complies with the set of response evaluation criteria, then the given one of the corresponding candidate responses can be identified.

In some implementations, the self-evaluation process described herein can be used during utilization of an NL based response system including an LLM to generate a response to an NL based input associated with (e.g. provided by) a user via a client device. The response identified as being the "highest quality" response (or the top N responses identified as being the "highest quality", where N is a positive integer greater than one) can be selected for being rendered at the client device and in response to the user's NL based input.

In some additional or alternative implementations, the self-evaluation process described herein can be used to generate synthetic training data for fine-tuning an LLM for subsequent utilization by, for example, an NL based response system. For instance, an NL based input can be obtained (for instance, from a database of previously submitted NL based inputs provided by one or more users), and provided as input to the NL based response system. The NL based response system can provide, as output, a high quality response by utilizing the self-evaluation process described herein. The NL based input and the high quality response can then be stored as a training instance to be used for fine-tuning the LLM. In some versions of those implementations, additional information, such as the number of response evaluation criteria the high quality response is determined to comply with, can also be stored in the training instance. For instance, the additional information can be used to provide a weighting for the high quality answer during fine-tuning. By fine-tuning the LLM based on examples of "high quality" responses, the average quality of responses generated using the fine-tuned LLM can be of a higher quality than corresponding responses generated using the LLM prior to fine-tuning. This process can be repeated, such that at each iteration, the average quality of response generated using the LLM is improved.

In these and other manners, responses generated using an LLM can be reliably of a higher quality. This can be the case whether the self-evaluation process described herein is used when the response is generated or is used to generate training data used in fine-tuning the LLM prior to the response being generated. As such, instances of subsequent (e.g. follow-up) NL based inputs provided by a user, e.g. in order to improve the quality of an initial response, which would otherwise be processed by the LLM can be reduced. For instance, if an initial response did not comply with an implied constraint from the initial NL based input, the user may provide a further NL based input which explicitly includes the constraint in order to force the LLM to generate a response which complies with the constraint. The user may repeat this process a number of times, for instance, if the subsequent responses do not adequately comply with the constraint, or if there are further implied constraints which the response does not comply with. As described herein, implementations which utilize the self-evaluation process can ensure that resources, which would otherwise be consumed in these repeated interactions with the LLM, can be conserved.

Furthermore, as described herein, a mechanism for self-evaluation for responses generated using an LLM is provided. In this way, the responses, and the corresponding NL based input, can be stored as training data, with the self-evaluation process providing a manner of labelling the training data without human intervention. As such, implementations described herein can provide a relatively low cost and time efficient manner of labelling training data as compared to, for instance, manually labelling training data by humans (e.g. manually indicating a relative or absolute quality of responses generated using an LLM).

In addition, in some instances, the self-evaluation process can be used as part of an NL based response system to be used for conducting a dialog (e.g., including multiple inputs and responses) with a human user. For instance, the NL based response system can be provided as part of an automated assistant, a chat bot, etc. In some cases, the user can provide one or more commands to be fulfilled as part of the dialog (e.g., to control a smart device, to generate code, to generate commands to control a robot, to assist with navigation in a vehicle, etc.). As such, use of the self-evaluation process described herein can also assist the user in performing a technical task by means of a continued and guided human-machine interaction process. Further, and since the responses generated using the LLM can be reliably of a higher quality, the human-machine interaction process can be concluded in a quick and efficient manner.

Furthermore, implementations described herein can allow a user to more easily and intuitively interact and control the NL based response system, which is itself a technical system. For instance, since the NL based response system can be capable of inferring response evaluation criteria from an NL based input, it is not necessary for the user to explicitly provide such information in the NL based input. As discussed herein, determining such information by a human can require trial and error, or can require high levels of skill, training, and/or familiarity with the particular LLM. As such, implementations described herein can mitigate these obstacles.

In other words, implementations described herein can provide a mechanism by which, without any additional interaction from the user, additional information that is in addition to the NL based input (e.g., the set of response evaluation criteria) can effectively be leveraged when processing the NL based input by the LLM to provide a higher quality response, and therefore more efficient access to the information stored in the LLM. This has the effect of augmenting the NL based input to the LLM, and thus improving the information retrieval by the LLM on an objective basis.

As mentioned, an LLM is typically trained with data from, for instance, webpages, electronic books, software code, electronic news articles, and machine translation data, and, when, for instance, generating a response to a particular NL based input, the LLM leverages the underlying data on which it was trained. In this way, an LLM can be considered to be a database structure with information stored in the parameters of the LLM. Since, as described herein, an NL based input to be processed by the LLM can be augmented by using the self-evaluation process described herein, this can be considered to be an improved database query, which can result in more efficient information retrieval.

The above description is provided as an overview of some implementations of the present disclosure. Further description of those implementations, and other implementations, are described in more detail below.

DETAILED DESCRIPTION OF THE DRAWINGS

Figure 1:
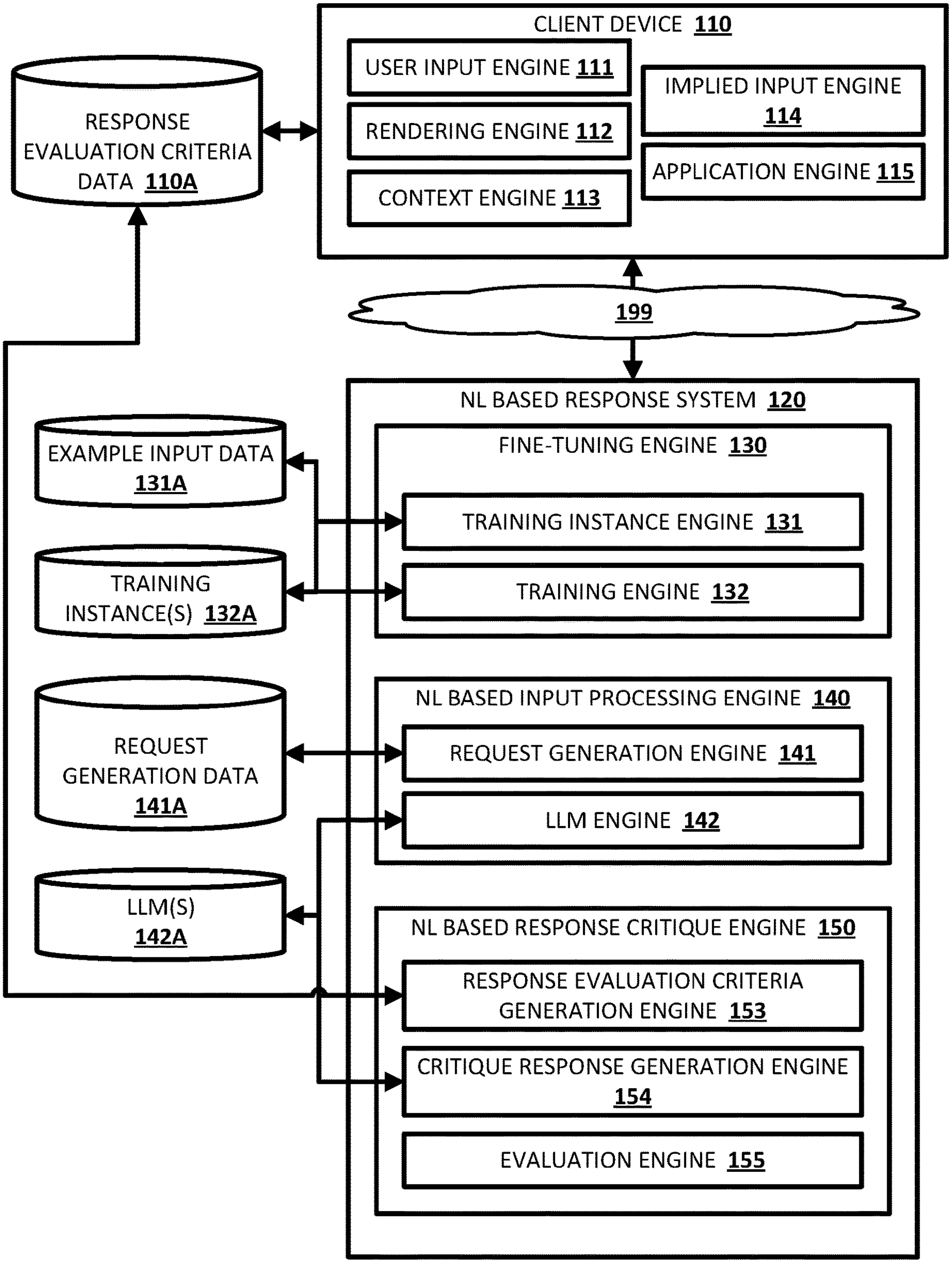
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a NL based response system 120.

In some implementations, all or some aspects of the NL based response system 120 can be implemented locally at the client device 110. In additional or alternative implementations, all or some aspects of the NL based response system 120 can be implemented remotely from the client device 110 as depicted in FIG. 1 (e.g., at remote server(s)). In those implementations, the client device 110 and the NL based response system 120 can be communicatively coupled with each other via one or more networks 199, such as one or more wired or wireless local area networks ("LANs," including Wi-Fi, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which NL based input can be submitted and/or NL based output and/or other output that is responsive to the NL based input can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser or automated assistant installed on top of the operating system of the client device 110. As another example, the application engine 115 can execute a web browser software application or automated assistant software application that is integrated as part of the operating system of the client device 110. The application engine 115 (and the one or more software applications executed by the application engine 115) can interact with the NL based response system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to touch or typed input directed to the client device 110.

Some instances of an NL based input described herein can be a query for an NL response that is formulated based on user input provided by a user of the client device 110 and detected via user input engine 111. For example, the query can be a typed query that is typed via a physical or virtual keyboard, a suggested query that is selected via a touch screen or a mouse of the client device 110, a spoken voice query that is detected via microphone(s) of the client device 110 (and optionally directed to an automated assistant executing at least in part at the client device 110), or an image or video query that is based on vision data captured by vision component(s) of the client device 110 (or based on NL input generated based on processing the image using, for example, object detection model(s), captioning model(s), etc.). Other instances of a NL based input described herein can be a prompt for NL content that is formulated based on user input provided by a user of the client device 110 and detected via the user input engine 111. For example, the prompt can be a typed prompt that is typed via a physical or virtual keyboard, a suggested prompt that is selected via a touch screen or a mouse of the client device 110, a spoken prompt that is detected via microphone(s) of the client device 110, or an image prompt that is based on an image captured by a vision component of the client device 110.

In various implementations, the client device 110 can include a rendering engine 112 that is configured to render content (e.g., NL based response(s)) for audible and/or visual presentation to a user of the client device 110 using one or more user interface output devices. For example, the client device 110 can be equipped with one or more speakers that enable the content to be provided for audible presentation to the user via the client device 110. Additionally, or alternatively, the client device 110 can be equipped with a display or projector that enables the content to be provided for visual presentation to the user via the client device 110.

In various implementations, the client device 110 can include a context engine 113 that is configured to determine a context (e.g., current or recent context) of the client device 110 and/or of a user of the client device 110 (e.g., an active user of the client device 110 when the client device 110 is associated with multiple users). In some of those implementations, the context engine 113 can determine a context based on data stored in response evaluation criteria data database 110A. The data stored in the response evaluation criteria data database 110A can include, for example, user interaction data that characterizes current or recent interaction(s) of the client device 110 and/or a user of the client device 110, location data that characterizes a current or recent location(s) of the client device 110 and/or a user of the client device 110, user attribute data that characterizes one or more attributes of a user of the client device 110, user preference data that characterizes one or more preferences of a user of the client device 110, user profile data that characterizes a profile of a user of the client device 110, third party (3P) data which is indicative of one or more response evaluation criteria defined by a 3P and/or any other data accessible to the context engine 113 via the client device data database 110A or otherwise.

For example, the context engine 113 can determine a current context based on a current state of a dialog session (e.g., considering one or more recent inputs provided by a user during the dialog session), profile data, and/or a current location of the client device 110. For instance, the context engine 113 can determine a current context of "best landmarks to visit in London" based on a recently issued query, profile data, and/or a current or an anticipated future location of the client device 110 (e.g., based on calendar information associated with the user accessible to the context engine 113). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting NL based input that is formulated based on user input, in generating an implied NL based input (e.g., an implied query or prompt formulated independent of any explicit NL based input provided by a user of the client device 110), and/or in determining to submit an implied NL based input and/or to render result(s) (e.g., an NL based output) for an implied NL based input.

In various implementations, the client device 110 can include an implied input engine 114 that is configured to: generate an implied NL based input independent of any user explicit NL based input provided by a user of the client device 110; submit an implied NL based input, optionally independent of any user explicit NL based input that requests submission of the implied NL based input; and/or cause rendering of response(s) for the implied NL based input, optionally independent of any explicit NL based input that requests rendering of the response(s). For example, the implied input engine 114 can use one or more past or current contexts, from the context engine 113, in generating an implied NL based input, determining to submit the implied NL based input, and/or in determining to cause rendering of response(s) that is responsive to the implied NL based input. For instance, the implied input engine 114 can automatically generate and automatically submit an implied query or implied prompt based on the one or more past or current contexts. Further, the implied input engine 114 can automatically push the response(s) that is generated responsive to the implied query or implied prompt to cause them to be automatically rendered or can automatically push a notification of the response(s), such as a selectable notification that, when selected, causes rendering of the response(s). Additionally, or alternatively, the implied input engine 114 can submit respective implied NL based input at regular or non-regular intervals, and cause respective response(s) to be automatically provided (or a notification thereof automatically provided). For instance, the implied NL based input can be "automated assistant news" based on the one or more past or current contexts indicating a user's general interest in automated assistants, the implied NL based input or a variation thereof periodically submitted, and the respective response(s) can be automatically provided (or a notification thereof automatically provided). It is noted that the respective response(s) can vary over time in view of, e.g., presence of new/fresh search result document(s) over time.

Further, the client device 110 and/or the NL based response system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices can be in communication with the client device 110 (e.g., over the network(s) 199). As another example, a given client device can be utilized by multiple users in a shared setting (e.g., a group of users, a household, a workplace, a hotel, etc.).

The NL based response system 120 is illustrated in FIG. 1 as including a fine-tuning engine 130, an NL based input processing engine 140, and an NL based response critique engine 150. Some of these engines can be combined and/or omitted in various implementations. Further, these engines can include various sub-engines. For instance, the fine-tuning engine 130 is illustrated in FIG. 1 as including a training instance engine 131 and a training engine 132. Further, the NL based input processing engine 140 is illustrated in FIG. 1 as including an LLM engine 142, and a request generation engine 141. Moreover, the NL based response critique engine 150 is illustrated in FIG. 1 as including a response evaluation criteria generation engine 153, a critique response generation engine 154, and an evaluation engine 155. Similarly, some of these sub-engines can be combined and/or omitted in various implementations. Accordingly, it should be understood that the various engines and sub-engines of the NL based response system 120 illustrated in FIG. 1 are depicted for the sake of describing certain functionalities and is not meant to be limiting.

Further, the NL based response system 120 is illustrated in FIG. 1 as interfacing with various databases, such as example input data database 131A, training instance(s) database 132A, LLM(s) database 142A, request generation data database 141A, response evaluation criteria data database 110A. Although particular engines and/or sub-engines are depicted as having access to particular databases, it should be understood that is for the sake of example and is not meant to be limiting. For instance, in some implementations, each of the various engines and/or sub-engines of the NL based response system 120 can have access to each of the various databases. Further, some of these databases can be combined and/or omitted in various implementations. Accordingly, it should be understood that the various databases interfacing with the NL based response system 120 illustrated in FIG. 1 are depicted for the sake of describing certain data that is accessible to the NL based response system 120 and is not meant to be limiting.

As described in more detail herein (e.g., with respect to FIGS. 2A-2C, 2A-3D, and 4-6), the NL based response system 120 can be utilized to self-evaluate initial candidate responses generated based on an NL based input. The NL based input can be processed by the LLM engine 142, using an LLM stored in the LLM(s) database 142A, to generate the initial candidate responses. A set of response evaluation criteria can be obtained by the response evaluation criteria generation engine 153 based on processing the NL based input using an LLM stored in the LLM(s) database 142A, and/or based on response evaluation criteria data stored in the response evaluation criteria data database 110A. The initial, candidate responses and the set of response evaluation criteria can be processed by the critique response generation engine 154, using an LLM stored in the LLM(s) database 142A, to generate critique responses indicative of a comparison between the initial, candidate responses and the set of response evaluation criteria. Both the response evaluation criteria generation and the critique response generation can be initiated based on processing, with the LLM, a request generated by request generation engine 141, using request generation data stored in the request generation data database 141A. A determination can be made as to which of the initial candidate responses best complies with the set of response evaluation criteria using the evaluation engine 155, based on the critique responses.

The NL based input can be associated with a client device 110 (for instance, provided by a user of the client device 110 via user input engine 111, implied input engine 114, etc.), and the self-evaluation can be used to select a particular response to be rendered (e.g., using rendering engine 112) at the client device (e.g. as described with respect to FIGS. 2B, 3A, 3B, 3C, 3D, and 5).

In additional or alternative implementations, the NL based input can be obtained from example input data stored in the example input data database 131A. In these implementations, the self-evaluation can be used to generate labelled training instances, including the NL based input and a response selected based on the determination of the evaluation engine 155 as to which of the candidate responses best complies with the set of response evaluation criteria (e.g., as described with respect to FIGS. 2C and 6). The training instances can be stored in the training instance(s) database 132A. An LLM stored in the LLM(s) database 142A can be fine-tuned using the training engine 132 based on the training instances stored in the training instance(s) database 132A (e.g., as described in FIG. 4). Additional description of the various engines and/or sub-engines of the NL based response system 120 is provided herein with respect to FIGS. 2A-2C, 3A-3D, and 4-6.

Figure 2A:
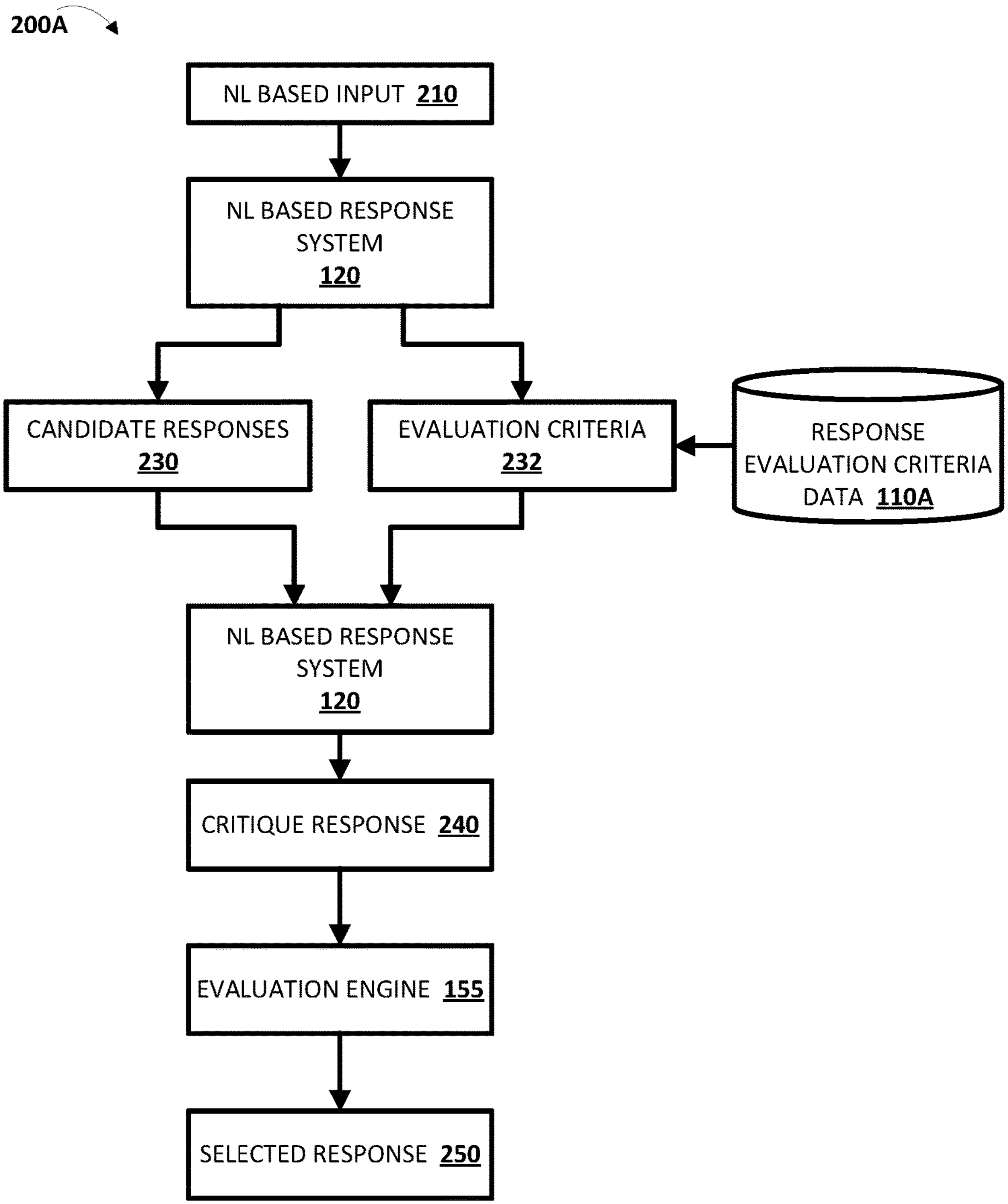
FIG. 2A depicts an example process flow for generating a response to a NL based input using an NL based response system, in accordance with various implementations.

Turning now to FIG. 2A, an example process flow 200A for generating a response to a NL based input using an NL based response system (e.g., the NL based response system 120 from FIG. 1) is depicted. As discussed herein, an NL based input 210 can be obtained. The NL based input 210 can be provided to the NL based response system 120 in order to obtain a response responsive to the NL based input 210. For instance, the NL based input 210 can include a query or a prompt. In some implementations, the NL based input 210 can include an intent to complete a particular task, for instance, to be fulfilled by an automated assistant that is communicatively coupled to the NL based response system (e.g., via the network(s) 199).

The NL based input 210 can be processed using an NL based response system, such as the NL based response system 120 as described in relation to FIG. 1. The NL based response system 120 can generate a plurality of candidate responses 230 based on processing the NL based input 210 (e.g., using the NL based input processing engine 140). In particular, the candidate responses 230 can be candidate LLM responses generated based on processing the NL based input 210 using an LLM (e.g., of the NL based response system 120). Since LLMs can be described as being probabilistic, the candidate responses 230 can differ from one another, despite being generated based on the same NL based input 210. As such, it can be assumed that the extent to which the candidate responses 230 actually are responsive to the NL based input 210 will vary.

In some implementations, a set of response evaluation criteria 232 can also be obtained. In some implementations, at least some of the set of response evaluation criteria can be generated by the NL based response system 120 (e.g., using the response evaluation criteria generation engine 153). For instance, the set of response evaluation criteria 232 can be generated based on processing the NL based input 210 with an LLM (e.g., the same LLM used in generating the candidate responses 230, or a different LLM stored in the LLM(s) database 142A).

In some versions of those implementations, the NL based response system 120 can generate at least some of the set of response evaluation criteria based on processing a request to generate the set of response evaluation criteria 232 along with the NL based input 210. The content of the request can be automatically generated during utilization of the NL based response system 120, or the content of the request can be generated prior to the utilization and retrieved (for instance, from request generation data database 141A) when required. In either case, the request to generate the response evaluation criteria 232 can be generated based on the obtained content. In some implementations, the request to generate the response evaluation criteria 232 can include at least one (e.g., 2, 10, 20, 100, etc.) example of response evaluation criteria for one or more given NL based input(s). For instance, the examples can be predefined by a human, and can guide the LLM as to an appropriate format and/or content of a response evaluation criteria for a given NL based input for use in the self-evaluation process described herein.

In some implementations, the set of response evaluation criteria 232 can be filtered based on one or more filtering criteria. The filtering criteria can include, for instance, length of a response evaluation criterion. For instance, if a response evaluation criterion from the set of response evaluation criteria 232 is too long (e.g., if it includes a number of words or characters above a threshold), it can be excluded from further processing to reduce a quantity of tokens to be processed using the LLM. Other filtering criteria are also possible, such as grammatical features, semantic content, etc.

In some implementations, at least some of the response evaluation criteria 232 can be obtained based on response evaluation criteria data stored in response evaluation criteria data database 110A. For instance, user information can be obtained. The user information can be associated with a user profile of the user accessible to the NL based response system 120. The user information can be retrieved from a device associated with the user, a remote server system, a local database, etc. The user information can include, for instance, user interaction history with the LLM and/or various software applications, user-defined preferences, contextual information within an ongoing dialog between the user and the LLM, etc.

In some versions of those implementations, at least some of the set of response evaluation criteria 232 can be generated based on processing the user information using the LLM (e.g., independently or along with the NL based input). Additionally, or alternatively, the user information itself can be indicative of response evaluation criteria. For instance, the user information can include response evaluation criteria (or a token indicative of response evaluation criteria) that has been determined based on information associated with the user (e.g., user preferences, etc.) and/or that is predetermined by the user. In this way, behavior of the NL based response system 120 can be personalized to the user (e.g., during utilization by the user and/or in generating training instances to fine-tune the LLM of the NL based response system 120 such that it is personalized to the user).

In some implementations, at least some of the response evaluation criteria 232 can be obtained based on information associated with a third party (3P). The 3P information can include (or be indicative of) information submitted by the 3P and/or information otherwise known regarding the 3P (e.g., based on publicly available information). In some versions of those implementations, at least some of the set of response evaluation criteria 232 can be generated based on processing the 3P information using the LLM (e.g., independently or along with the NL based input). Additionally, or alternatively, the 3P information itself can be indicative of response evaluation criteria. For instance, the 3P information can include response evaluation criteria (or a token indicative of response evaluation criteria) that has been determined based on 3P information associated with the 3P (e.g., values provided by the 3P, etc.) and/or that is predetermined by the 3P.

As one non-limiting example, the NL based response system 120 can be provided on behalf of a 3P. The 3P can provide an interface by which users can provide input (e.g., via a chatbot available on a webpage associated with the 3P). The 3P interface can then conduct interaction between the NL based response system 120 and the user, for instance, using an application programming interface (API). The 3P can also provide information indicative of response evaluation criteria (e.g., tokens or response evaluation criteria themselves based on 3P defined rules) to be processed by the NL based response system 120. In this way, a mechanism is provided by which a 3P can provide an additional signal to an NL based response system 120 when generating responses to user input in order to bias the responses generated, without requiring any additional resource intensive training. Additionally, or alternatively, the 3P can provide information indicative of response evaluation criteria during training or fine-tuning of the LLM of the NL based response system 120. In this way, a simple and relatively inexpensive (e.g., as compared to the 3P developing their own NL based response system 120 and/or training their own LLM) mechanism by which a NL based response system 120 can be personalized to a 3P is provided.

In various implementations, the NL based response system 120 can generate critique responses 240 based on processing the candidate responses 230 and the set of response evaluation criteria 232. The critique responses 240 can be indicative of an extent to which the candidate responses 230 comply with the set of response evaluation criteria 232.

In some implementations, the generation of the critique responses 240 can be initiated by a request for the LLM to generate the critique responses 240. For instance, the request can be generated and processed, along with the candidate responses 230 and the set of response evaluation criteria 232, using the LLM. The content of the request for the LLM to generate the critique responses 240 can be predefined, or can be generated through utilization of the NL based response system 120. As described herein, there are various mechanisms by which the candidate responses 230 can be evaluated. As will be appreciated, attributes of the request (such as the format and content of the request) can influence the form of the critique responses 240 generated using the LLM. As such, the attributes of the request can be chosen based on the particular implementation of evaluation of the candidate responses 230. In some implementations, the request does not include any examples of critique responses for the LLM. In this way, the critique responses 240 generated using the LLM can be less constrained (e.g., by attributes of any examples provided).

Based on the critique responses 240, one (or more) of the candidate responses 230 can be selected using evaluation engine 155. For instance, the candidate response 230 which is determined to best comply with the set of response evaluation criteria 232 based on the critique response(s) 240 can be selected as the selected response. In some implementations, more than one of the candidate responses 230 can be selected using the evaluation engine 155 (for instance, if multiple candidate responses 230 are determined to equally comply with the set of response evaluation criteria 232, if a second candidate response is above a threshold compliance of the set of response evaluation criteria 232, if the NL based response system 120 is configured to provide multiple responses, etc.). In this case, the order of the selected responses 250, based on how well they comply with the set of response evaluation criteria 232 can be indicated. Additionally, or alternatively, an indication of the extent to which each of the selected responses 250 complies with the set of response evaluation criteria 232 (e.g., a comparison measure, as described herein) can be provided.

As an example of a particular evaluation mechanism, a critique response 240 can be generated for each of the candidate responses 230. For instance, a critique response 240 can include an indication of an extent to which a corresponding one of the candidate responses 230 complies with the set of response evaluation criteria 232. The critique response 240 can also include an indication of a reasoning for why the corresponding candidate response 230 is determined to comply or not comply with each of the set of response evaluation criteria. In order to initiate the generation of these critique responses, a request for the LLM to indicate the extent to which each of the candidate responses 230 complies with the set of response evaluation criteria 232 can be generated and processed using the LLM.

In particular, a critique response 240 can include a comparison measure determined based on comparing the set of response evaluation criteria 232 to the corresponding candidate response 230, using the LLM. The comparison measure can be indicative of the number of response evaluation criteria 232 the corresponding candidate response 230 is determined to comply with and/or an extent to which the corresponding candidate response 230 complies with a given criterion included in the response evaluation criteria 232. For instance, the comparison measure can be determined by dividing the number of response evaluation criteria the corresponding candidate response 230 is determined to comply with by the total number of response evaluation criteria in the set of response evaluation criteria 232.

In some implementations, a plurality of critique responses 240 can be generated for each of the candidate responses 230. Since, as described herein, the LLM can be probabilistic, each of the critique responses 240 for a corresponding candidate response 230 can vary (e.g., in terms of which of the set of response evaluation criteria 232 the corresponding response 230 complies with, or the reasoning provided for why this is the case), even though the same input data (e.g., the NL based input 210, context, and/or other input data described herein) is processed using the LLM. As such, the critique responses 240 (or the comparison measures of the critique responses 240) for a corresponding candidate response 230 can be summarized (e.g., averaged, summed, concatenated, most consistent response determined, etc.).

Alternatively, or additionally, the critique response 240 for a corresponding candidate response 230 can be filtered based on one or more filtering criteria. For example, if the indication of the reasoning of a particular critique response 240 includes more than a threshold number of words or characters, it can be excluded from further processing (e.g., discounted from the summarizing). As another example, if a particular critique response 240 for a corresponding candidate response 230 has a lower than threshold consistency measure with the other critique responses 240 for the corresponding candidate response 230, it can be excluded from further processing. As yet another example, when a plurality of corresponding critique responses 240 are generated for each of the candidate responses 230, a comparison measure for a given candidate response 230 can be determined based on a quantity of the critique responses 240 for the given candidate response 230 that indicate that the given candidate response 230 complies with at least a threshold number of the response evaluation criteria 232. For instance, the comparison measure can be based on a percentage or the total number of critique responses 240 that indicate that the candidate response 230 complies with at least a threshold number of the response evaluation criteria 232.

Based on the critique responses 240, one (or more) of the candidate responses 230 can be selected using evaluation engine 155. For instance, the candidate response 230 which is determined to comply with the most response evaluation criteria of the set of response evaluation criteria 232 can be selected as the selected response 250. This can be determined on the basis of the comparison measure. For instance, the candidate response with the highest corresponding comparison measure (e.g., as indicated by the corresponding critique response 240) can be selected as the selected response 250.

As an example of this particular evaluation mechanism, assume that NL based input X has been submitted to the NL based response system 120, which has responsively provided candidate responses A, B and C. Further assume that the NL based response system 120 has obtained a set of response evaluation criteria Y which includes eight response evaluation criteria, and has generated critique responses A*, B*, and C* based on comparing the candidate responses A, B, and C to the set of response evaluation criteria Y respectively. In this example, critique response A* indicates that candidate response A complies with six out of eight of the set of response evaluation criteria Y (e.g. critique response A* can include a comparison measure of 0.75). Further, critique response B* indicates that candidate response B complies with seven out of eight of the set of response evaluation criteria Y (e.g. critique response B* can include a comparison measure of 0.875). Moreover, critique response C* indicates that candidate response C complies with two out of eight of the set of response evaluation criteria Y (e.g. critique response C* can include a comparison measure of 0.25). Accordingly, in this example, candidate response B can be selected as the selected candidate response using the evaluation engine 155 since it has been determined to comply with the highest number of the set of response evaluation criteria Y (and can thus be considered to be the "highest quality" response).

As another example of a particular evaluation mechanism, one or more critique responses 240 can be generated for all of the candidate responses 230. For instance, the critique response(s) 240 can be generated based on comparing all of the candidate responses 230 with the set of response evaluation criteria 232, using the LLM. The critique response(s) 240 can thus include an indication of a candidate response 230 which is determined to best comply with the set of response criteria 232. The critique response(s) 240 can also include an indication of the reasoning for why the particular candidate response 230 was determined to best comply with the set of response evaluation criteria 232. Generating the critique response(s) can be initiated by generating and processing a request for the LLM to determine which one of the candidate responses 230 best complies with the set of response evaluation criteria 232. Where a single critique response 240 is generated, the candidate response 230 determined as best complying with the set of response evaluation criteria 232 in the critique response 240 can be selected as the selected response 250.

In some implementations, multiple critique responses 240 can be generated using the LLM, with each of the critique responses 240 including an indication as to which of the candidate responses 230 best complies with the set of evaluation criteria 232. As described herein, since the LLM can be probabilistic in nature, each of the critique responses 240 may vary (e.g. in terms of the candidate response 230 indicated as best complying the set of response evaluation criteria 232 and/or in the indication of reasoning provided), even though the critique responses 240 were generated based on the same candidate responses 230 and the same set of response evaluation criteria 232 using the LLM. Additionally, or alternatively, multiple critique responses 240 can be generated based on processing the candidate responses 230 with different subsets of the set of response evaluation criteria 232, to generate more diverse critique responses 240. From the plurality of critique responses 240, it can be determined which of the candidate responses 230 is most consistently (e.g., most often) determined as best complying with the set of response evaluation criteria 232. This candidate response 230 can thus be selected as the selected response 250. In this example, a comparison measure can be determined across the plurality of critique responses 240. The comparison measure can be indicative of a consistency across the plurality of critique responses 240 for the selected response 250 being indicated as the candidate response 230 which best complies with the set of response evaluation criteria 232. For instance, the comparison measure can be based on performing majority voting over the plurality of critique responses 240. In some implementations, the comparison measure can be in a range between 0 and 1.

As described herein, the plurality of critique responses 240 can be filtered based on one or more filtering criteria. Based on the filtering, a subset of the plurality of critique responses 240 can be identified for further processing (e.g., in selecting the selected response 250).

As an example of this particular evaluation mechanism, assume that NL based input X has been submitted to the NL based response system, which has responsively provided candidate responses A, B and C. Further assume that the NL based response system has obtained a set of response evaluation criteria Y, and has generated critique responses D, E, F, G, and H based on determining which of the candidate responses A, B, and C best complies with the set of response evaluation criteria Y over five iterations. Critique responses D, F, G, and H each indicate that candidate response A best complies with the set of response evaluation criteria Y. Critique response E indicates that candidate response C best complies with the set of response criteria. In other words, it can be considered that candidate A has received four "votes" for best complying with the set of response evaluation criteria Y. It can also be considered that candidate response C has received one "vote" for best complying with the set of response evaluation criteria Y. In this case, candidate response A can be selected as the selected candidate response since it has been determined most consistently that candidate response A best complies with the set of response evaluation criteria Y (and can thus be considered to be the "highest quality" response). Put another way, candidate response A has received the most "votes", and will be selected due to majority voting. Since candidate response A received four out of five "votes", a corresponding comparison measure can be determined as 0.8.

Figure 2B:
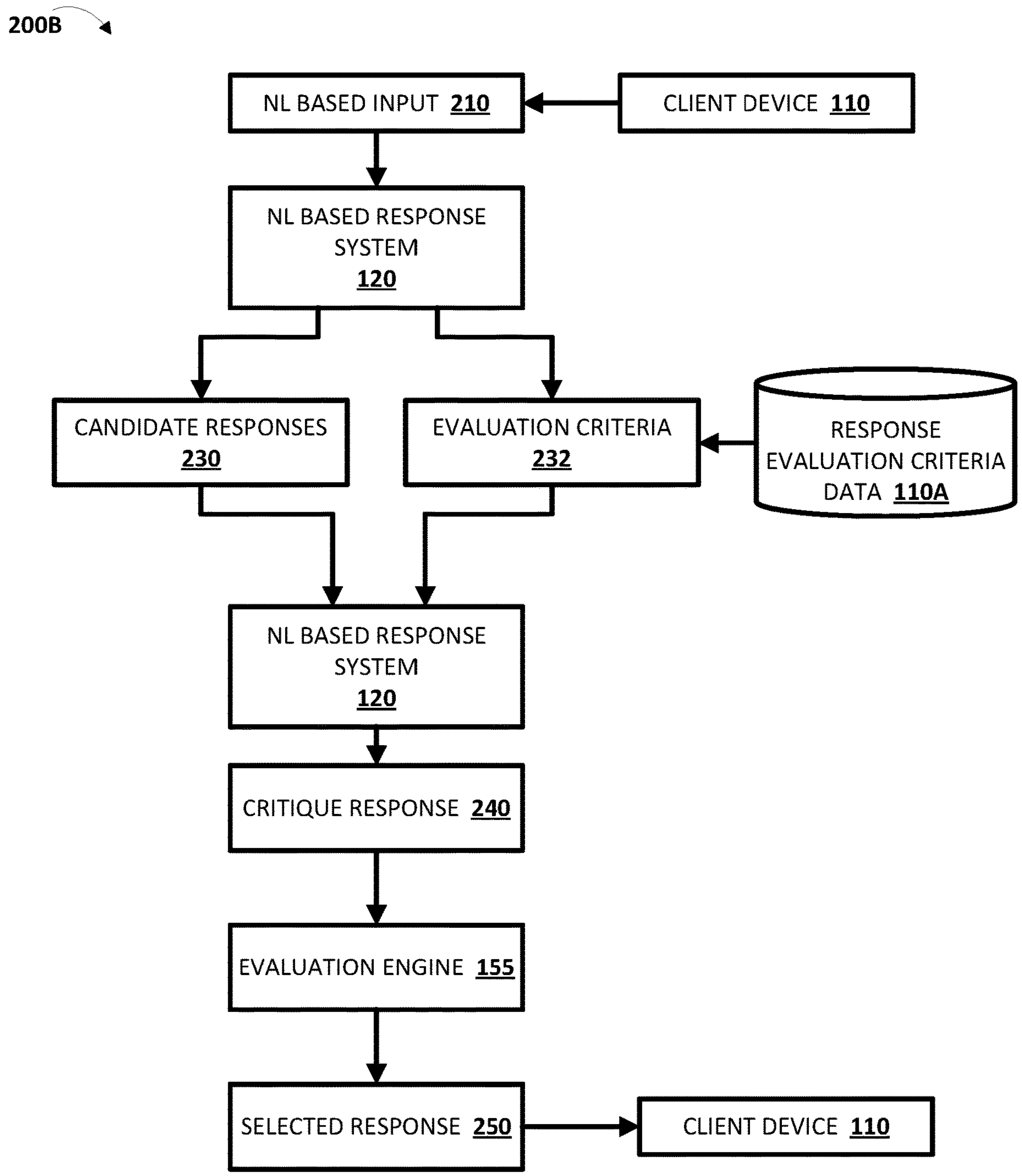
FIG. 2B depicts an example process flow for generating and causing display of a response to a NL based input associated with a client device using an NL based response system, in accordance with various implementations.

Turning now to FIG. 2B, an example process flow 200B for generating and causing display of a response to a natural language (NL) based input associated with a client device using an NL based response system (e.g., NL based response system 120) is depicted. The example process flow 200B of FIG. 2B is largely the same as the example process flow 200A described in relation to FIG. 2A. However, as shown in FIG. 2B, the NL based input 210 can be associated with a client device 110. Furthermore, the selected response 250 can be provided for rendering at the client device 110, whereas the selected response 250 in FIG. 2A can be utilized to fine-tune the LLM.

For instance, the NL based input 210 can be provided based on user input by a user of the client device. The user can provide the user input, for instance, by typing on a virtual or physical keyboard of the client device, providing speech which is captured by one or more microphones of the client device 110, selection (e.g., via tapping on a touch screen display, voice command, using a pointing device, etc.) a suggested input, providing gestures captured by one or more sensors of the client device 110, etc. Information indicative of the user input can be used to determine the NL based input 210. For instance, the information can include text entered, selected, or determined based on processing the user's speech using speech recognition. This text can then be provided as the NL based input. As another example the information can include one or more token(s) which can be used to determine the NL based input 210 (e.g., by the client device or the NL based response system 120). The information can be provided to the NL based response system by the client device 110, for instance via a wireless network (such as network 199).

Similarly, the selected response 250 (or information indicative of the selected response 250) can be provided to the client device 110 by the NL based response system 120 (e.g., via network 199). A command can also be sent to the client device 110 to cause the client device 110 to render the selected response (e.g., via a display of the client device 110, via a speaker of the client device 110, etc.). However, in some implementations, it can be assumed that the client device 110, upon receiving the selected response 250, will render the selected response 250, without any explicit command to do so being received. In some implementations, more than one of the candidate responses 230 can be selected to be sent to the client device 110. In this case, the client device 110 can render one or more of the received selected responses 250. For instance, the client device 110 can determine which of the selected responses 250 to render. This determination 110 can be based on additional information received from the NL based response system (e.g., comparison measures associated with the selected responses 250).

Although it has generally been described that the client device 110 to which the NL based input 210 is associated and the client device 110 which renders the selected response 250 are the same client device 110, in some implementations this may not be the case. In other words, the client device 110 which renders the selected response 250 can be a different client device 110 than the client device which provided the NL based input 210. For instance, the selected response 250 can be rendered on a display separate from (but possibly associated with, for instance, by virtue of a user account being signed in on both devices) a smart speaker which received the NL based input 210.

In this way, the NL based response system 120, and particularly the self-evaluation mechanism described herein, can be utilized to generate responses to NL based inputs 210 associated with a client device 110 and cause rendering of selected responses 250 by the client device 110. In other words, the NL based response system 120, and particularly the self-evaluation mechanism described herein, can be utilized to provide responses for a user. Put another way, the NL based response system 120, and particularly the self-evaluation mechanism described herein, can be used during inference using the LLM. As such, resources required to process repeated interactions (e.g., follow-up NL based input(s)) with LLM (e.g., of the NL based response system 120) which could otherwise occur in order to refine an initial response can be conserved. In addition, expert knowledge and experience required to formulate an NL based input in order to retrieve a particular response can be reduced and/or eliminated altogether. An example of the self-evaluation process during inference using an LLM (e.g., of the NL based response system 120) is described herein in relation to FIGS. 3A to 3D.

Figure 3A:
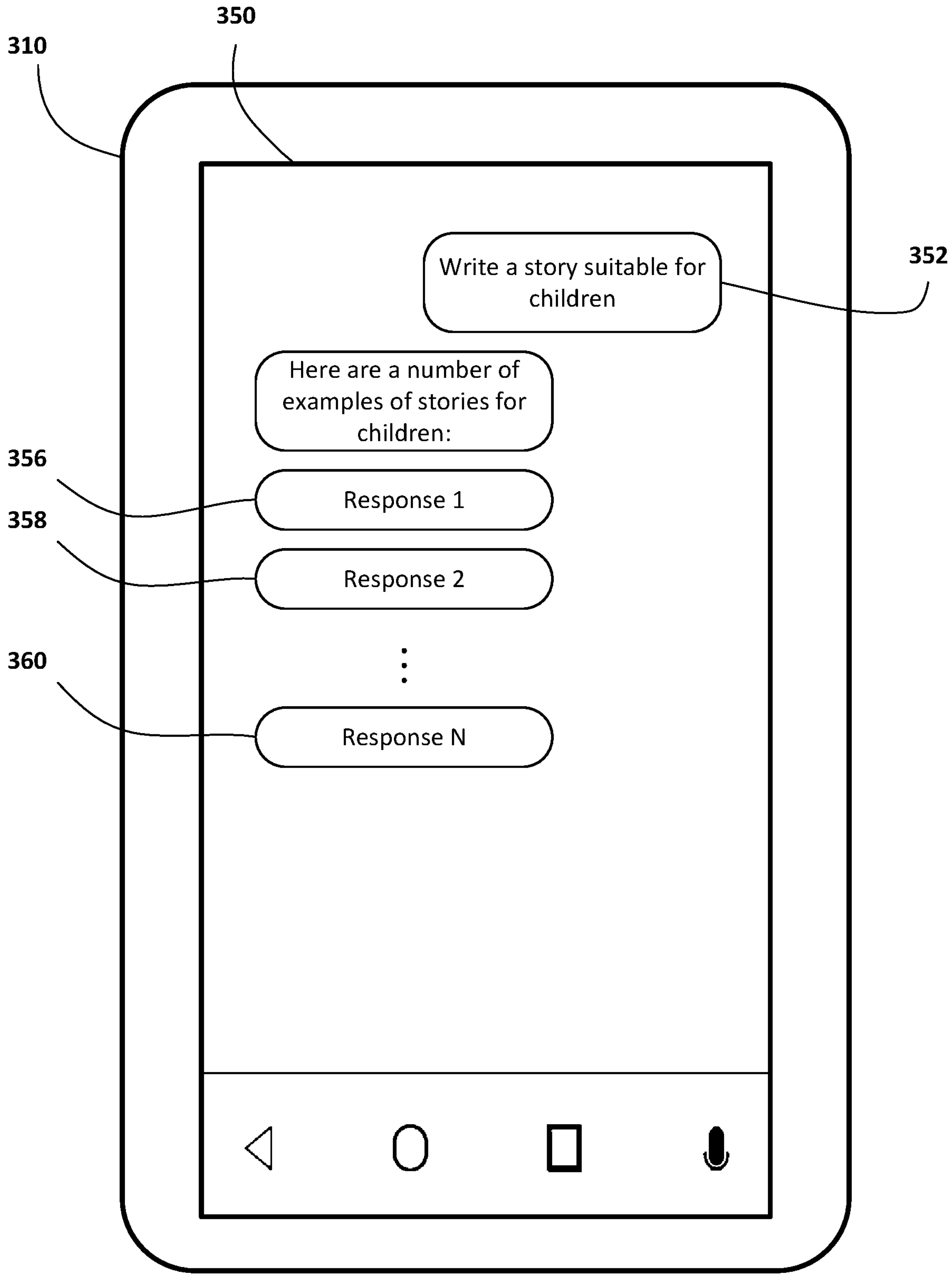
FIG. 3A depicts an example client device rendering a graphical interface that includes a plurality of candidate responses generated using an NL based response system.

For example, and referring briefly to FIG. 3A, an example client device 310 with a display 350 rendering a graphical interface is depicted. The graphical interface includes an NL based input 352 associated with a client device 310 (e.g., an instance of the client device 110 from FIG. 1). For instance, a user of the client device 310 can provide the NL based input 352 (e.g., via touch or typed input received at a touch screen display of the client device 310, via spoken input captured in audio data generated by one or microphones of the client device 310, etc.).

The graphical interface also includes a plurality of candidate responses 356, 358, 360 generated using an NL based response system (e.g., NL based response system 120) based on processing the NL based input 352. As depicted in FIG. 3A, any number N of candidate responses 356, 358, 360 can be generated.

Figure 3B:
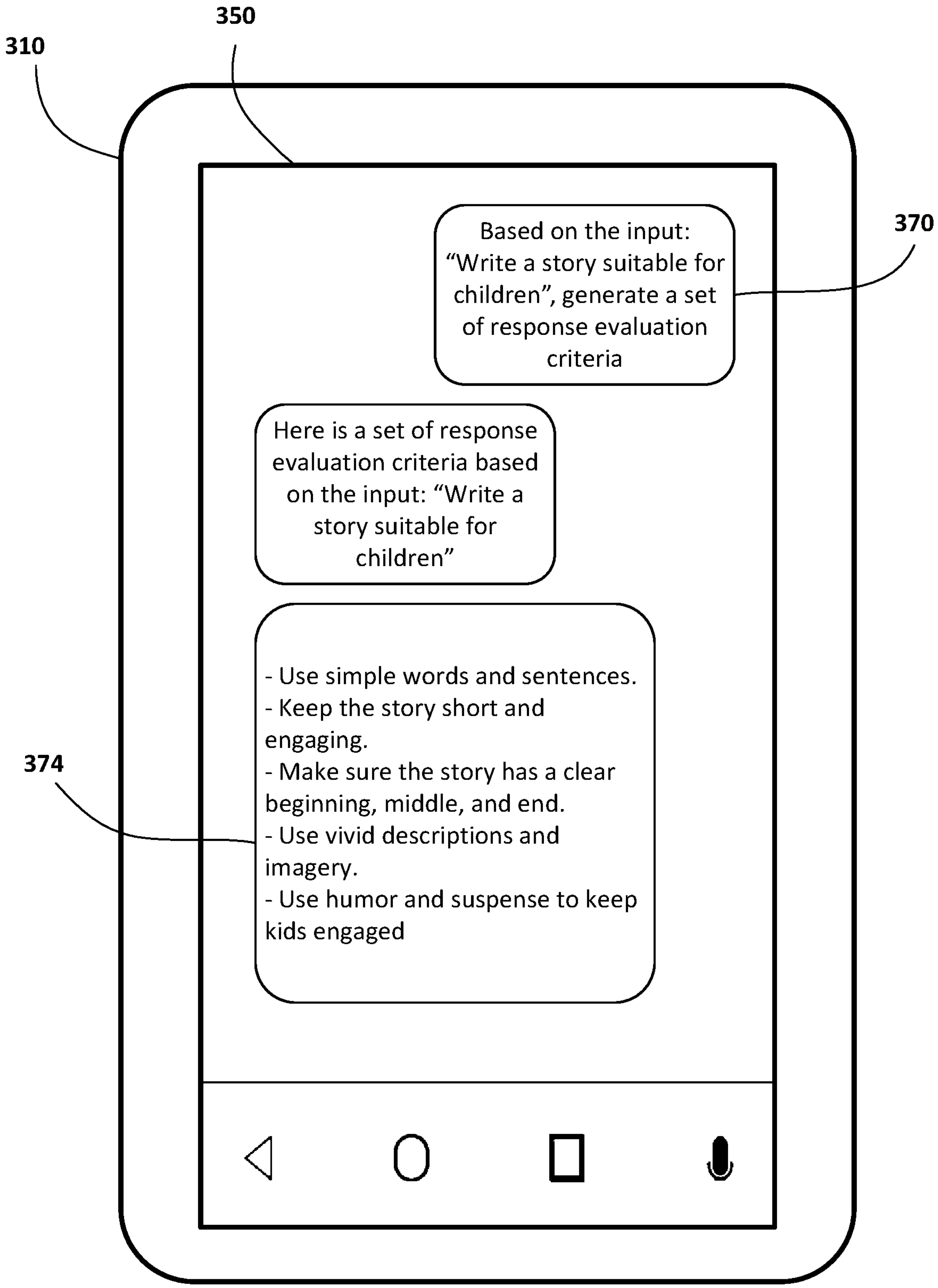
FIG. 3B depicts an example client device rendering a graphical interface that includes a set of response evaluation criteria generated based on processing the NL based input of FIG. 3A.

Referring briefly to FIG. 3B, the client device 310 with display 350 is depicted now rendering a graphical interface that includes a set of response evaluation criteria 374, generated based on processing the NL based input 352 of FIG. 3A using an NL based response system (e.g., the NL based response system 120 from FIG. 1). The set of response evaluation criteria 374 can be generated based on processing a request 370 to generate a set of response evaluation criteria. The request 370 can be automatically (e.g., without human interaction) generated and/or processed. In some implementations, the request 370 can include one or more example pairs of set(s) of response evaluation criteria with corresponding NL based input(s). Although the set of response evaluation criteria 374 are depicted as being rendered at the graphical interface, it should be understood that is for the sake of illustrating some example response evaluation criteria for a given NL based input and is not meant to be limiting. Rather, it should be understood that, in various implementations, the set of response evaluation criteria 374 may not be depicted at the graphical interface.

Figure 3C:
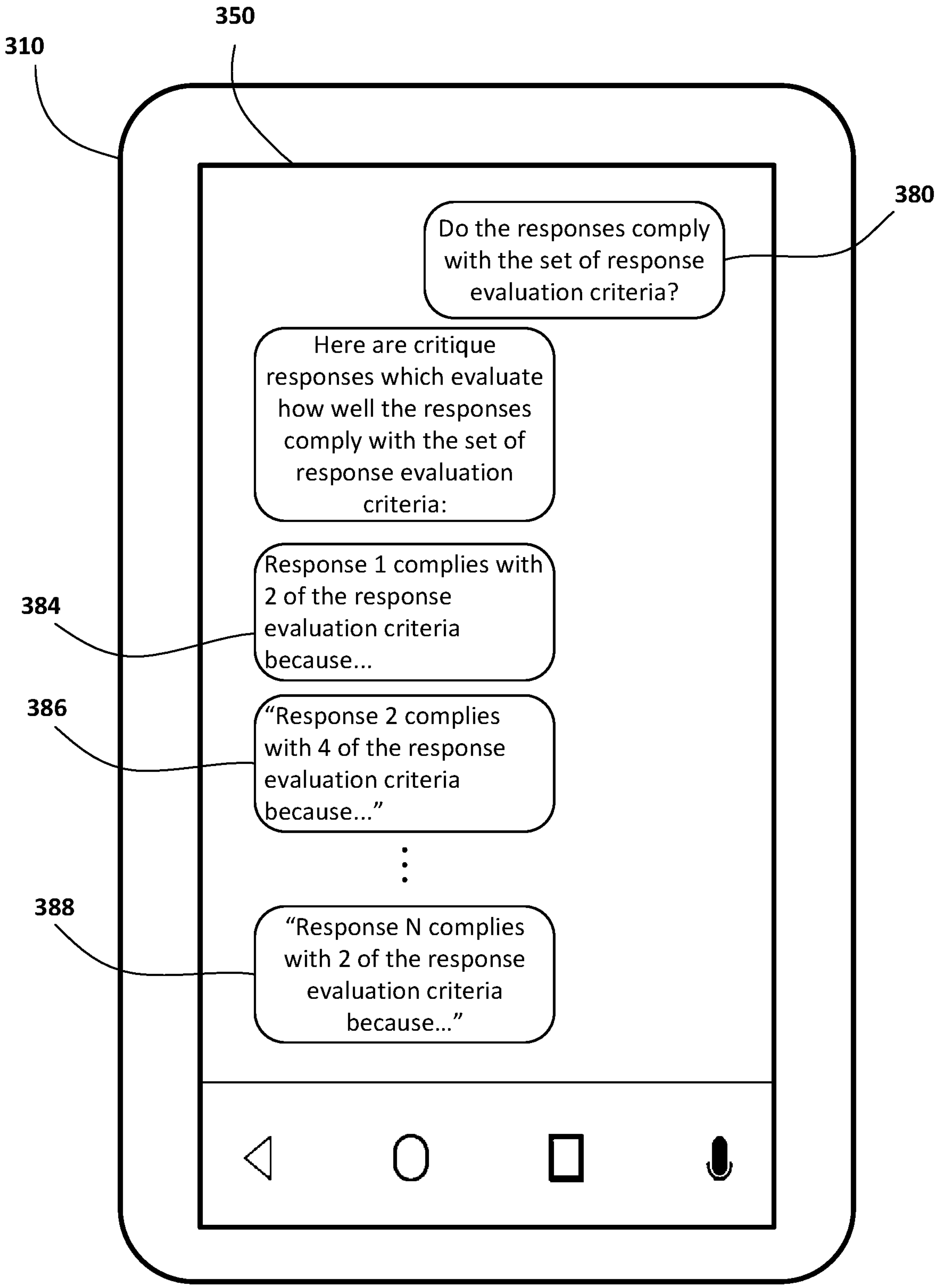
FIG. 3C depicts an example client device rendering a graphical interface that includes critique responses generated based on processing the plurality of candidate responses of FIG. 3A and the corresponding response evaluation criteria of FIG. 3B.

Referring briefly to FIG. 3C, the client device 310 is depicted now rendering a graphical interface that includes critique responses 384, 386, 388 generated based on processing the plurality of candidate responses 356, 358, 360 of FIG. 3A and the corresponding response evaluation criteria 374 of FIG. 3B with an NL based response system (e.g., NL based response system 120). The critique responses 384, 386, 388, can be generated based on processing a request 380 to generate the set of critique responses 384, 386, 388. The request 380 can be automatically (e.g., without human interaction) generated and/or processed. In this example, the critique responses 384, 386, 388 can include an indication of how many of the set of response evaluation criteria 374 a corresponding candidate response 356, 358, 360 complies with. The critique responses 384, 386, 388 can also include an indication of a reasoning for why a corresponding candidate response 356, 358, 360 complies (or not) with each of the set of response evaluation criteria. Although the critique responses 384, 386, 388 are depicted as being rendered at the graphical interface, it should be understood that is for the sake of illustrating some example critique responses for corresponding candidate responses generated based on a given NL based input and is not meant to be limiting. Rather, it should be understood that, in various implementations, the critique responses 384, 386, 388 may not be depicted at the graphical interface.

Figure 3D:
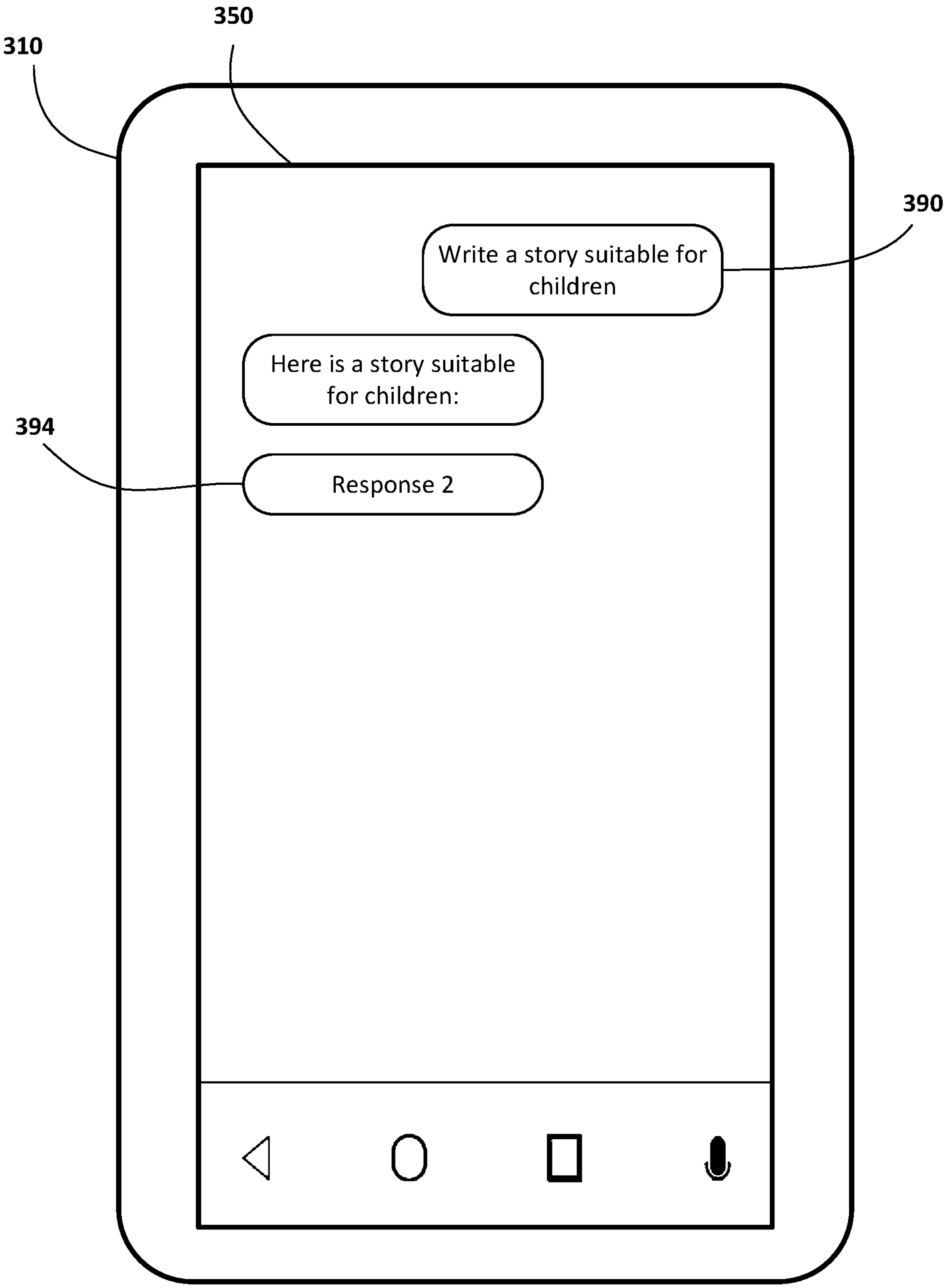
FIG. 3D depicts an example client device rendering a graphical interface that includes a selected response that has been selected from the candidate responses of FIG. 3A based on the critique responses of FIG. 3C.

Referring briefly to FIG. 3D, the client device 310 is depicted now rendering a graphical interface that includes a selected response 394 for NL based input 390 that has been selected from the candidate responses 384, 386, 388 of FIG. 3A based on the critique responses 384, 386, 388 of FIG. 3C. The response 394 can be selected based on the corresponding critique response 386 indicating that the corresponding candidate response 358 complies with the greatest number of response evaluation criteria (e.g., relative to the other candidate responses 356, 360). Although the selected response 394 is depicted as being the only response rendered at the graphical interface, it should be understood that is for the sake of example and is not meant to be limiting. Rather, it should be understood that, in various implementations, multiple responses can be rendered. In implementations where multiple responses are rendered, the selected response 394 can be rendered more prominently than the other responses.

As noted above, although intermediate stages of the self-evaluation process are shown as being rendered by client device 310 in FIGS. 3A, 3B, and 3C, in many implementations, some or all of the intermediate stages can occur in the background (e.g., without being rendered by client device 310). For instance, an NL based input 390 can be received (e.g., from a user of the client device 310), and rendered by the client device 310. The client device 310 can then be caused to render the selected response 394, without being caused to render any of the preceding stages (e.g., as shown in FIGS. 3A, 3B, and 3C). In other words, the only graphical interface rendered by the client device 310 in relation to processing an NL based input 390 with an NL based response system (e.g., NL based response system 120), can be as shown in FIG. 3D. Additionally, or alternatively, the NL based input 390 need not be rendered by the client device 310. In this way, by minimizing the amount of data to be rendered by the client device 310, computing resources can be conserved. In addition, by progressing through the self-evaluation process without human interaction (whether or not various intermediate stages are completed in the background), resources (e.g., time and energy) consumed in completing the self-evaluation process can be conserved.

Figure 2C:
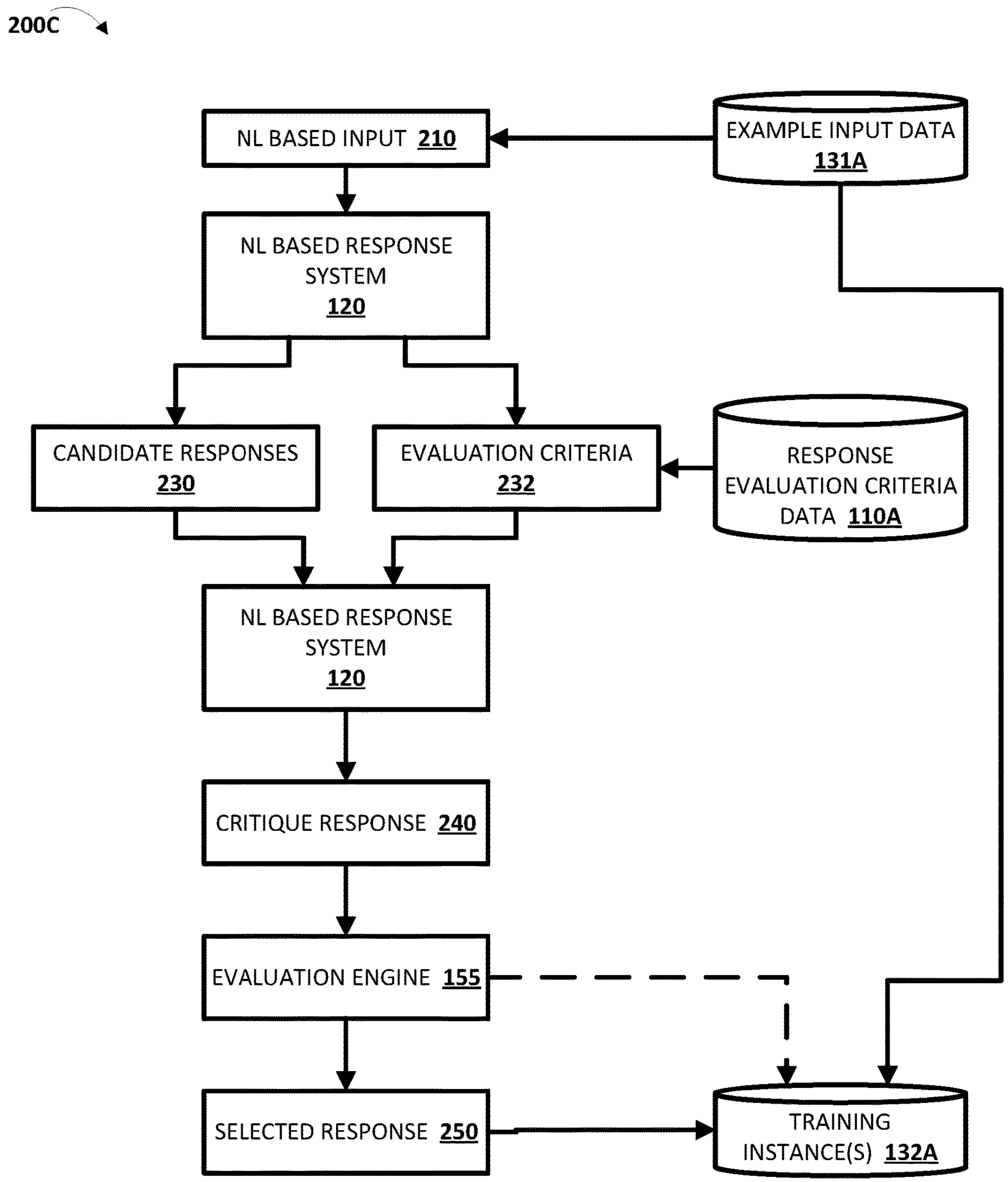
FIG. 2C depicts an example process flow for generating training instances by generating a response to a NL based input using an NL based response system, in accordance with various implementations.

Turning now to FIG. 2C, an example process flow 200C for generating training instances by generating a response to a natural language (NL) based input using an NL based response system (e.g., NL based response system 120) is depicted. The example process flow of FIG. 2C is largely the same as the example process flow 200A described in relation to FIG. 2A. However, as shown in FIG. 2C, the NL based input 210 can be obtained from an example input data database 131A. Furthermore, the selected response 250, the NL based input 210, and optionally additional data from evaluation engine 155 can be stored in a training instance(s) database 132A.

The example input data database 131A can include a number of example NL based inputs. The example NL based inputs can be obtained from previous usage of the NL based response system 120 (or another NL based response system). For instance, during utilization of the NL based response system 120 as described in relation to FIG. 2B, the NL based input 210 associated with the user can be stored as an example NL based input. Additionally, or alternatively, the example NL based inputs can be specifically generated (e.g. by a human, by an example input data generator model, etc.) to be used as example NL based inputs. In some implementations, the example data inputs can be generated (or filtered) to include "difficult" NL based inputs (e.g., an NL based input which would usually result in the generation of a poor response). Difficult NL based inputs can be identified, for instance, if it is determined that processing of the NL based input with the NL based response system 120 (e.g., before fine-tuning using the self-evaluation techniques described herein) would result in a response which does not comply with at least a threshold number of response evaluation criteria. As another example, a difficult NL based input can be identified if it is determined that a user provided one or more subsequent inputs to refine a response generated based on the difficult NL based input.

As described in relation to FIG. 2A, the selected response 250 can be selected from the candidate responses 230 based on it being determined that the selected response 250 best complies with the evaluation criteria 232 (e.g., using the critique response(s) 240). In other words, the selected response 250 can be considered to be a "good", or "high quality response" to the NL based input 210 obtained from the example input data database 131A. As such, the NL based input 210 can be stored along with the selected response 250 in the training instance(s) database 132A. In some implementations, more than one of the candidate responses 230 (e.g., the top two candidate responses 230, the top five candidate responses 230, etc.) can be selected to be stored as a training instance. In this way, multiple examples of "high quality" responses can be identified for a single NL based input 210 obtained from the example input data database 131A, with minimal additional processing. In some implementations, additional data can also be stored as part of the training instance. For instance, the additional data can include a comparison measure (e.g., an indication of the percentage of response evaluation criteria of the set of response evaluation criteria the corresponding selected response(s) complies with 250, an indication of the consistency of the selected response(s) 250 being chosen as best complying with the set of response evaluation criteria, etc.). The additional data can be used, for instance, to provide a weighting to the corresponding selected response 250 during fine-tuning by the NL based response system 120 of an LLM that is accessible thereby, or to train a reward model for use in fine-tuning by the NL based response system 120 of an LLM thereof that is accessible thereby.

The training instance(s) database 132A can include training instances generated as described in relation to FIG. 2C and/or obtained in any other way prior to the generation of the training instances as described in relation to FIG. 2C (e.g., manual generation of training data, etc.). In this way, training data can be generated without the need for manual human labelling. This can greatly reduce the resources required to obtain training data to fine-tune an LLM (e.g., of the NL based response system).

Once the training instance(s) have been generated in this manner, the NL based response system 120 (or an LLM thereof), can be fine-tuned (or otherwise termed, trained) using the training instances stored in the training instance(s) database 132A (e.g., using training engine 132). This can be performed in any suitable way (e.g., supervised learning, reinforcement learning, etc.).

Figure 4:
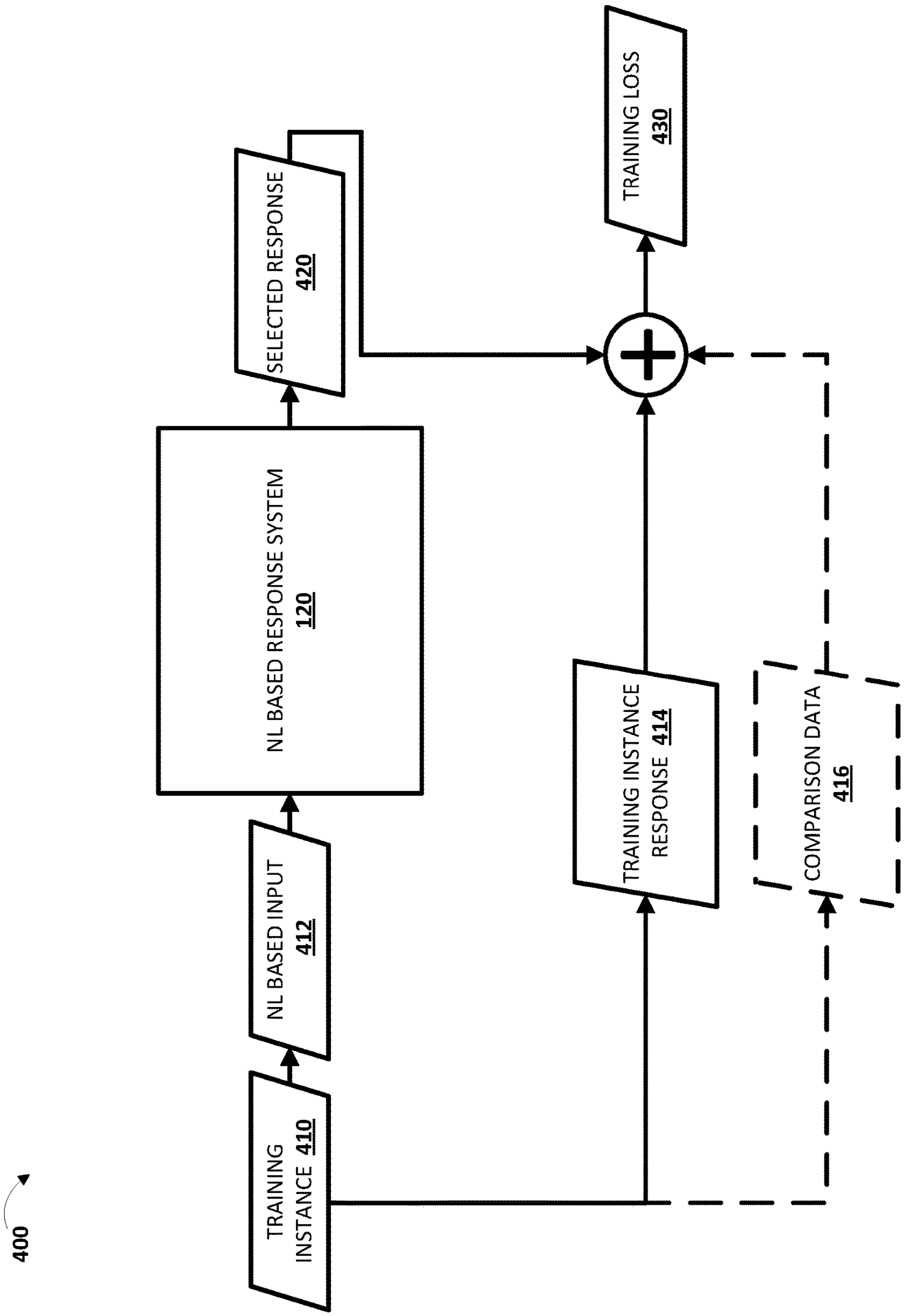
FIG. 4 depicts an example process flow for fine-tuning a large language model, in accordance with various implementations.

For instance, and referring briefly to FIG. 4, an example process flow 400 for fine-tuning a large language model (e.g., of an NL based response system 120) is depicted. As shown in FIG. 4, an NL based input 412 and a training instance response 414 can be obtained from a particular training instance 410 (which can be retrieved, e.g., from training instance(s) database 132A). A selected response 420 can be generated based on processing the NL based input 412 using the NL based response system 120 (or using an LLM thereof), for instance, as described in relation to FIG. 2A. The selected response 420 can be compared with the training instance response 414 to generate a training loss 430. Comparing the selected response 420 with the training instance response 414 can include, for instance, tokenization, natural language understanding (NLU), natural language processing (NLP), etc. For instance, rather than the responses themselves being compared, embeddings generated (in any suitable way) based on the responses can be compared to generate the training loss 430. Moreover, the NL based response system 120 (or an LLM thereof) can be updated based on the training loss 430.

In some implementations, additional data, such as comparison data 416 can be obtained from the training instance 410 as well. The comparison data 416 can be included in the comparison between the selected response 420 and the training instance response 414. The comparison data 416 can be used to provide a weighting to the comparison when generating the training loss 430. For instance, if the comparison data 416 indicates that the training instance response 414 is of a very high quality (e.g. if it is determined to comply with all of the response evaluation criteria), a difference between the selected response 420 and the training instance response 414 can be propagated to a greater extent (e.g. by determining a larger training loss 430, by giving the training loss 430 a greater significance during training, etc.), and vice versa. As another example, the comparison data 416 can be used to train a separate reward model for use in fine-tuning the LLM (e.g., of the NL based response system 120) using reinforcement learning.

Once the LLM (e.g., of the NL response system 120) has been fine-tuned, the fine-tuned LLM can be deployed for use in generating responses to NL based input. In some cases, the NL based response system 120 can be updated with the fine-tuned LLM for use in inference (e.g., in the manner described in relation to FIG. 2B) or in further generation of training data and fine-tuning (e.g. in the manner described in relation to FIG. 2C).

Figure 5:
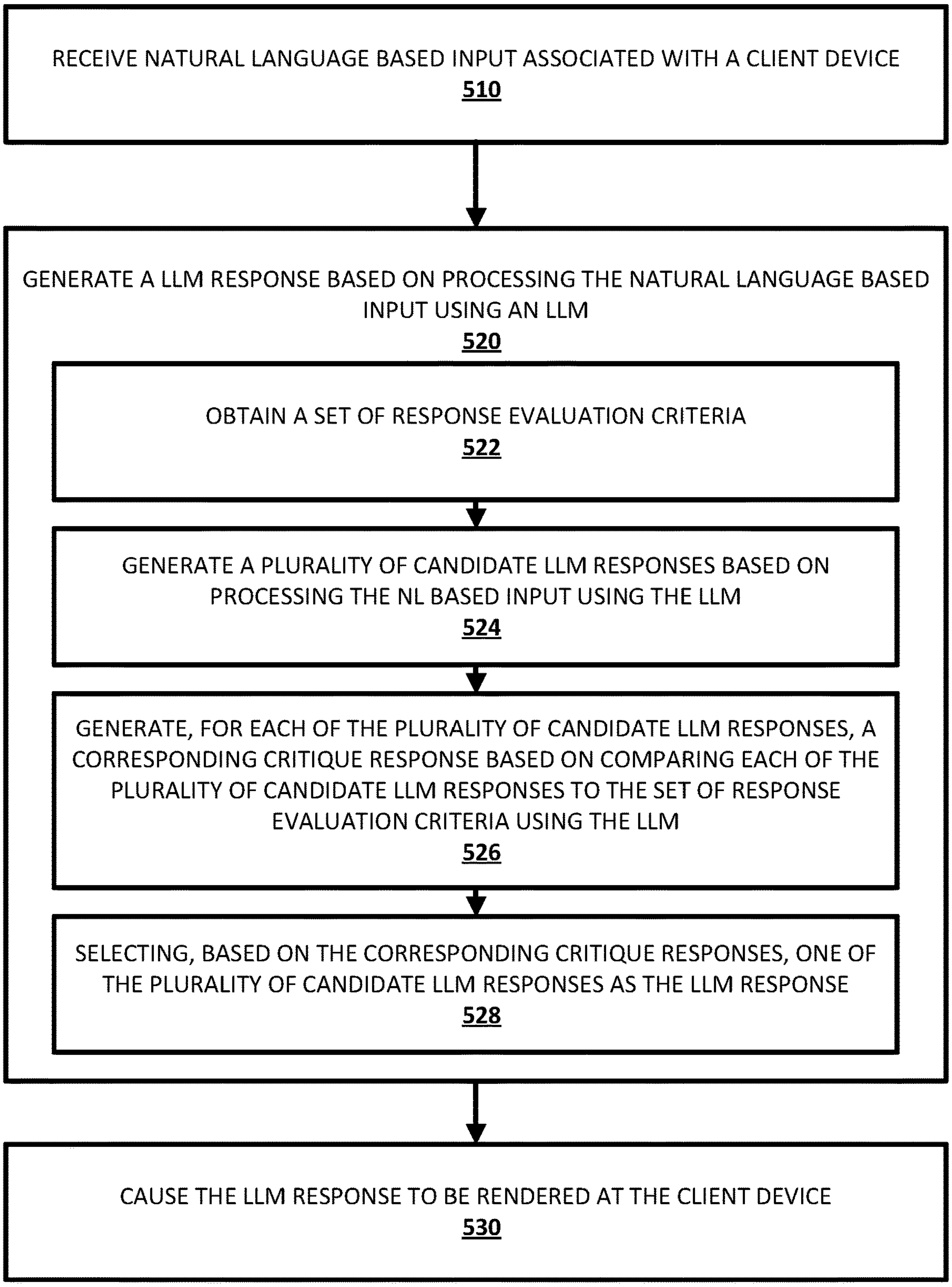
FIG. 5 depicts a flowchart illustrating an example method of utilizing an NL based response system to generate a response to an NL based input associated with a client device, in accordance with various implementations.

Turning now to FIG. 5, a flowchart illustrating an example method 500 of utilizing an NL based response system to generate a response to an NL based input associated with a client device using self-evaluation, in accordance with various implementations is depicted. For convenience, the operations of the method 500 are described with reference to a system that performs the operations. This system of the method 500 includes one or more processors, memory, and/or other component(s) of computing device(s) (e.g., client device 110 of FIG. 1, NL based response system 120 of FIGS. 1, 2A, 2B, 2C, and 4, client device 310 of FIGS. 3A, 3B, 3C, and 3D, computing device 710 of FIG. 7, one or more servers, and/or other computing devices). Moreover, while operations of the method 500 are shown in a particular order, this is not meant to be limiting. One or more operations may be reordered, omitted, and/or added.

At block 510, the system receives a natural language (NL) based input associated with a client device (e.g., in the same or similar manner described with respect to FIGS. 2A, 2B, and 2C, and/or in other manners described herein).

At block 520, the system generates a large language model (LLM) response based on processing the NL based input using an LLM. In various implementations, block 520 can include block 522, block 524, block 526, and/or block 528 for utilization in generating the LLM response.

At block 522, the system obtains a set of response evaluation criteria (e.g., in the same or similar manner described with respect to FIGS. 2A, 2B, and 2C, and/or in other manners described herein). In some implementations, obtaining the set of response evaluation criteria can include generating the set of response evaluation criteria based on processing the NL based input using the LLM. In addition, a request for the LLM to generate a set of response evaluation criteria based on the NL based input can be generated. In some cases, the request can include at least one example of a response evaluation criteria for a given example NL based input. The request can be processed, using the LLM, to generate the set of response evaluation criteria. In some implementations, the set of response evaluation criteria can be filtered, based on one or more filtering criteria. Based on the filtering, a subset of the set of response evaluation criteria generated using the LLM can be identified (e.g., for further processing with the NL based response system).

In some implementations, obtaining the set of response evaluation criteria can additionally or alternatively include obtaining user information associated with the user of the client device. The set of response evaluation criteria can then be determined based on the user information. The user information can include, for instance, one or more of: user interaction history with the LLM and/or another application, user-defined preferences, and contextual information within an ongoing dialog between the user and the LLM, wherein the NL based input is associated with the ongoing dialog.

In some implementations, obtaining the set of response evaluation criteria can additionally or alternatively include obtaining information indicative of a set of response evaluation criteria associated with a third party (3P). The set of response evaluation criteria can then be determined based on the obtained information.

At block 524, the system generates a plurality of candidate LLM responses based on processing the NL based input using the LLM (e.g., in the same or similar manner described with respect to FIGS. 2A, 2B, and 2C, and/or in other manners described herein).

At block 526, the system generates, for each of the plurality of candidate LLM responses, a corresponding critique response based on comparing each of the plurality of candidate LLM responses to the set of response evaluation criteria using the LLM (e.g., in the same or similar manner described with respect to FIGS. 2A, 2B, and 2C, and/or in other manners described herein).

Generating a corresponding critique response for a given candidate LLM response can include, for example, generating a request for the LLM to determine which of the set of response evaluation criteria the given candidate LLM response complies with. The request can then be processed using the LLM to generate the corresponding critique response. In some implementations, the request does not include any examples of a critique response.

Each of the corresponding critique responses can include an indication of an extent to which a corresponding one of the plurality of candidate LLM responses complies with the set of response evaluation criteria. For instance, a comparison measure can be determined for each of the plurality of candidate LLM responses, and included in the corresponding critique responses. The comparison measure can be based on comparing each of the plurality of candidate LLM responses to the set of response evaluation criteria using the LLM.

For instance, the comparison measure for a given candidate LLM response can be indicative of the number of response evaluation criteria from among the set of response evaluation criteria the given candidate LLM response is determined to comply with (e.g., using the LLM). As a specific example, the comparison measure for a given candidate LLM response can be determined by dividing the number of response evaluation criteria of the set of response evaluation criteria the given candidate LLM is determined to comply with by the total number of response evaluation criteria of the set of response evaluation criteria.

In addition, each of the corresponding critique responses can include an indication of a reasoning for why a corresponding one of the plurality of candidate LLM responses complies (or not) with the set of response evaluation criteria In some implementations, a plurality of corresponding critique responses are generated for each of the plurality of candidate LLM responses. In this case, the corresponding critique responses can be filtered based on the reasoning. Additionally, or alternatively, in this case, the comparison measure for a given candidate LLM response can be determined based on a quantity of the plurality of critique responses for the given candidate LLM response that indicate that the given candidate LLM response complies with at least a threshold number of response evaluation criteria from the set of response evaluation criteria.

At block 528, the system selects, based on the corresponding critique responses, one of the plurality of candidate LLM responses as the LLM response (e.g., in the same or similar manner described with respect to FIGS. 2A, 2B, and 2C, and/or in other manners described herein). For example, selecting one of the plurality of candidate LLM responses as the LLM response can include determining which of the plurality of candidate LLM responses has the highest comparison measure. The candidate LLM response determined to have the highest comparison measure can then be selected as the LLM response.

At block 530, the system causes the LLM response to be rendered at the client device.

In some implementations, the NL based input and the selected LLM response can be stored as training data for use in subsequent fine-tuning of the LLM. The corresponding critique response (e.g., including the corresponding comparison data) can also be stored as training data. At a subsequent time, the LLM can be fine-tuned based on the training data.

Figure 6:
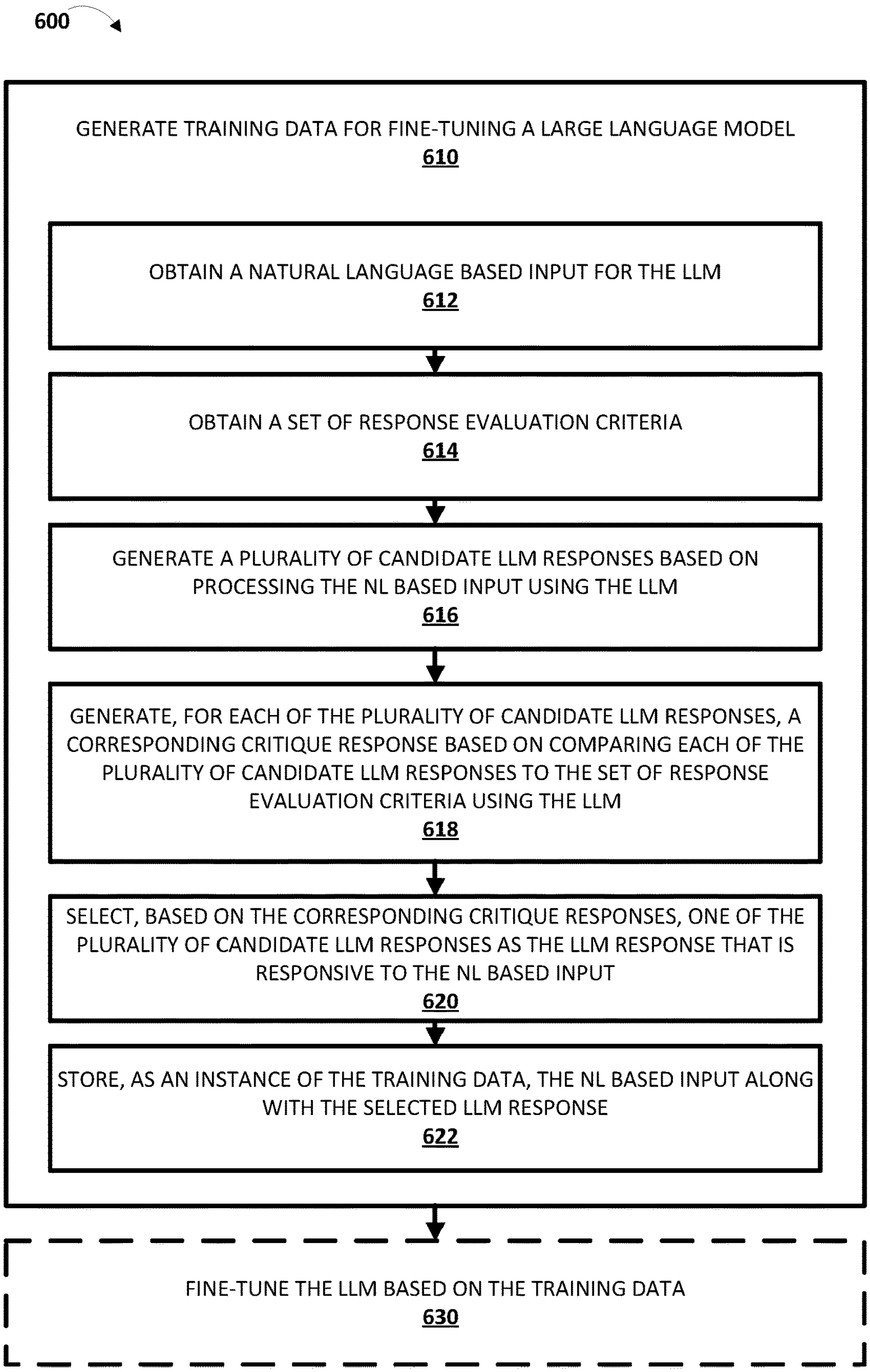
FIG. 6 depicts a flowchart illustrating an example method of generating training instances by utilizing an NL based response system to generate a response to an NL based input, in accordance with various implementations.

Turning now to FIG. 6, a flowchart illustrating an example method of generating training instances by utilizing an NL based response system to generate a response to an NL based input using self-evaluation, in accordance with various implementations is depicted. For convenience, the operations of the method 600 are described with reference to a system that performs the operations. This system of the method 600 includes one or more processors, memory, and/or other component(s) of computing device(s) (e.g., client device 110 of FIG. 1, NL based response system 120 of FIGS. 1, 2A, 2B, 2C, and 4, client device 310 of FIGS. 3A, 3B, 3C, and 3D, computing device 710 of FIG. 7, one or more servers, and/or other computing devices). Moreover, while operations of the method 600 are shown in a particular order, this is not meant to be limiting. One or more operations may be reordered, omitted, and/or added.

At block 610, the system generates training data for fine-tuning a large language model (LLM) (e.g., in the same or similar manner described with respect to FIGS. 2A, 2B, and 2C, and/or in other manners described herein). In various implementations, block 610 can include block 612, block 614, block 616, block 618, block 620, and block 622.

At block 612, the system obtains a natural language (NL) based input for the LLM (e.g., in the same or similar manner described with respect to FIGS. 2A, 2B, and 2C, and/or in other manners described herein). The NL based input can be retrieved, for instance, from a database storing example natural language inputs. The example natural language inputs can be, for instance, NL based inputs previously provided to a NL based response system.

At block 614, the system obtains a set of response evaluation criteria (e.g., in the same or similar manner described with respect to FIGS. 2A, 2B, and 2C, and/or in other manners described herein).

At block 616, the system generates a plurality of candidate LLM responses based on processing the NL based input using the LLM (e.g., in the same or similar manner described with respect to FIGS. 2A, 2B, and 2C, and/or in other manners described herein).

At block 618, the system generates, for each of the plurality of candidate LLM responses, a corresponding critique response based on comparing each of the plurality of candidate LLM responses to the set of response evaluation criteria using the LLM (e.g., in the same or similar manner described with respect to FIGS. 2A, 2B, and 2C, and/or in other manners described herein).

At block 620, the system selects, based on the corresponding critique responses, one of the plurality of candidate LLM responses as an LLM response that is responsive to the NL based input (e.g., in the same or similar manner described with respect to FIGS. 2A, 2B, and 2C, and/or in other manners described herein).

At block 622, the system stores, as an instance of the training data, the NL based input along with the LLM response that is selected from among the plurality of candidate LLM responses.

At optional block 630, the system fine-tunes the LLM based on the training data (e.g., in the same or similar manner described with respect to FIG. 4, and/or in other manners described herein).

In some implementations, the LLM can be fine-tuned using reinforcement learning (RL). For instance, a reward model can be generated based on a selected LLM response to a NL based input along with its corresponding comparison measure. Fine-tuning the LLM can then include fine-tuning the LLM with (RL) using the reward model.

In some implementations, subsequent to fine-tuning the LLM, the LLM can be deployed for use in generating responses to NL based inputs. For instance, an NL based input associated with a client device can be received. An LLM response can be generated based on processing the NL based input associated with the client device using the fine-tuned LLM. The client device can then be caused to render the LLM response.

Figure 7:
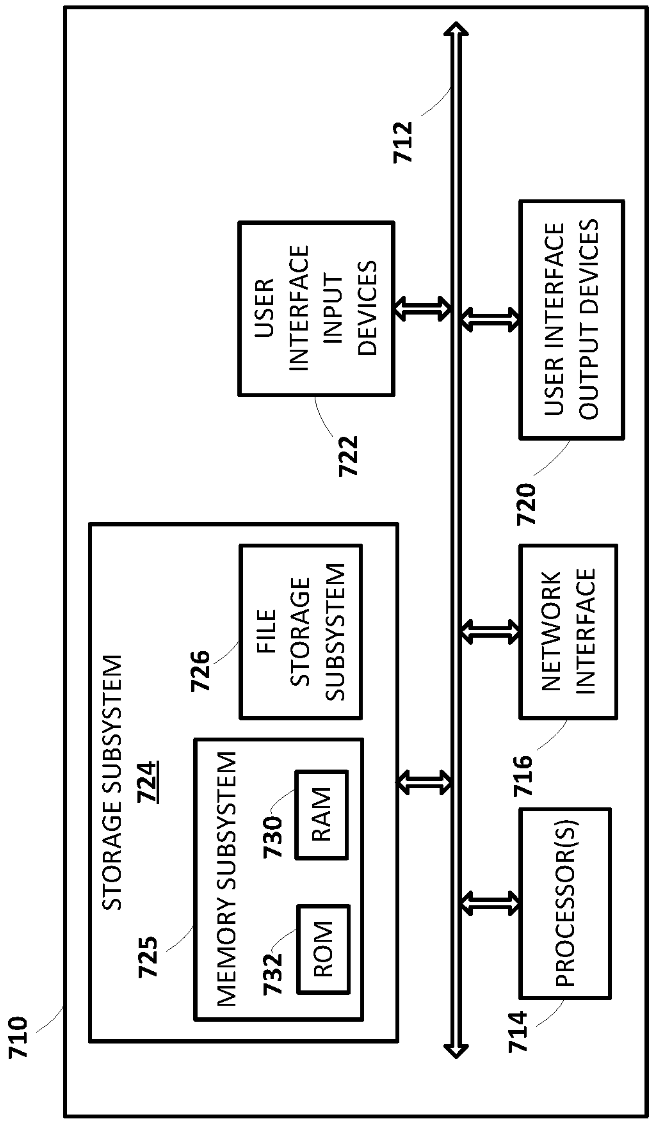
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more of a client device, cloud-based automated assistant component(s) or other cloud-based software application component(s), and/or other component(s) can include one or more components of the example computing device 710.

Computing device 710 typically includes at least one processor 714 which communicates with a number of peripheral devices via bus subsystem 712. These peripheral devices can include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 can include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 can include the logic to perform selected aspects of the methods disclosed herein, as well as to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 can use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or can make use of personal and/or monitored information), the users can be provided with an opportunity to control whether programs or features collect user information (e.g., information about a user's social network, social actions or activities, profession, a user's preferences, or a user's current geographic location), or to control whether and/or how to receive content from the content server that can be more relevant to the user. Also, certain data can be treated in one or more ways before it is stored or used, so that personal identifiable information is removed. For example, a user's identity can be treated so that no personal identifiable information can be determined for the user, or a user's geographic location can be generalized where geographic location information is obtained (such as to a city, ZIP code, or state level), so that a particular geographic location of a user cannot be determined. Thus, the user can have control over how information is collected about the user and/or used.

In some implementations, a method implemented by one or more processors is provided, and includes receiving natural language (NL) based input associated with a client device; and generating a large language model (LLM) response based on processing the NL based input using an LLM. Generating the LLM response includes obtaining a set of response evaluation criteria; generating a plurality of candidate LLM responses based on processing the NL based input using the LLM; generating, for each of the plurality of candidate LLM responses, a corresponding critique response based on comparing each of the plurality of candidate LLM responses to the set of response evaluation criteria using the LLM; and selecting, based on the corresponding critique responses, one of the plurality of candidate LLM responses as the LLM response. The method further includes causing the LLM response to be rendered at the client device.

These and other implementations can optionally include one or more of the following features.

In some implementations, each of the corresponding critique responses can include an indication of an extent to which a corresponding one of the plurality of candidate LLM responses complies with the set of response evaluation criteria.

In some versions of these implementations, the indication of the extent to which a corresponding one of the plurality of candidate LLM responses complies with the set of response evaluation criteria can include a comparison measure, the comparison measure can be generated, for each of the plurality of candidate LLM responses, based on comparing each of the plurality of candidate LLM responses to the set of response evaluation criteria using the LLM.

In some implementations, obtaining the set of response evaluation criteria can include generating the set of response evaluation criteria based on processing the NL based input using the LLM. In some versions of those implementations, generating the set of response evaluation criteria can include: generating a request for the LLM to generate a set of response evaluation criteria based on the NL based input; and processing the request using the LLM to generate the set of response evaluation criteria.

In some implementations, obtaining the set of response evaluation criteria can include obtaining user information associated with the user of the client device; and determining the set of response evaluation criteria based on the user information.

In some implementations, obtaining the set of response evaluation criteria can include obtaining information indicative of a set of response evaluation criteria associated with a third party (3P); and determining the set of response evaluation criteria based on the obtained information.

In some implementations, generating a corresponding critique response for a given candidate LLM response can include: generating a request for the LLM to determine which of the set of response evaluation criteria the given candidate LLM response complies with; and processing the request using the LLM to generate the corresponding critique response.

In some implementations, a method implemented by one or more processors is provided, and includes generating training data for fine-tuning a large language model (LLM). Generating the training data includes obtaining a natural language (NL) based input for the LLM; obtaining a set of response evaluation criteria; generating a plurality of candidate LLM responses based on processing the NL based input using the LLM; generating, for each of the plurality of candidate LLM responses, a corresponding critique response based on comparing each of the plurality of candidate LLM responses to the set of response evaluation criteria using the LLM; selecting, based on the corresponding critique responses, one of the plurality of candidate LLM responses as an LLM response that is responsive to the NL based input; and storing, as an instance of the training data, the NL based input along with the LLM response that is selected from among the plurality of candidate LLM responses.

These and other implementations can optionally include one or more of the following features.

In some implementations, the method can further include fine-tuning the LLM based on the training data.

In some versions of those implementations, the method can further include generating, for each of the plurality of candidate LLM responses, and based on comparing each of the plurality of candidate LLM responses to the set of response evaluation criteria using the LLM, a corresponding comparison measure, and training a reward model based on the selected one of the plurality of candidate LLM responses and the corresponding comparison measure. Fine-tuning the LLM can include fine-tuning the LLM with reinforcement learning (RL) using the reward model.

In additional or alternative versions of those implementations, the method can further include, subsequent to fine-tuning the LLM: receiving an NL based input associated with a client device; generating an LLM response based on processing the NL based input associated with the client device using the LLM; and causing the LLM response to be rendered at the client device.

In some implementations, each of the corresponding critique responses can include an indication of an extent to which a corresponding one of the plurality of candidate LLM responses comply with the set of response evaluation criteria.

In some versions of those implementations, the indication of the extent to which a corresponding one of the plurality of candidate LLM responses complies with the set of response evaluation criteria can include a comparison measure, the comparison measure can be generated, for each of the plurality of candidate LLM responses, based on comparing each of the plurality of candidate LLM responses to the set of response evaluation criteria using the LLM.

In some implementations, obtaining the set of response evaluation criteria can include generating the set of response evaluation criteria based on processing the NL based input using the LLM.

In some versions of those implementations, generating the set of response evaluation criteria can include generating a request for the LLM to generate a set of response evaluation criteria based on the NL based input; and processing the request using the LLM to generate the set of response evaluation criteria.

In some implementations, obtaining the set of response evaluation criteria can include obtaining user information associated with the user of the client device; and determining the set of response evaluation criteria based on the user information.

In some implementations, obtaining the set of response evaluation criteria can include obtaining information indicative of a set of response evaluation criteria associated with a third party (3P); and determining the set of response evaluation criteria based on the obtained information.

In some implementations, generating a corresponding critique response for a given candidate LLM response can include generating a request for the LLM to determine which of the set of response evaluation criteria the given candidate LLM response complies with; and processing the request using the LLM to generate the corresponding critique response.

In some implementations, a method implemented by one or more processors is provided, and includes receiving natural language (NL) based input; and generating a large language model (LLM) response based on processing the NL based input using an LLM. Generating the LLM response can include obtaining a set of response evaluation criteria; generating a plurality of candidate LLM responses based on processing the NL based input using the LLM; generating, at least one critique response based on comparing each of the plurality of candidate LLM responses to the set of response evaluation criteria using the LLM; and selecting, based on the corresponding critique responses, one of the plurality of candidate LLM responses as the LLM response. The at least one critique response is indicative of a candidate LLM response from among the plurality of candidate LLM responses which is determined to best comply with the set of response criteria. The method further includes causing the LLM response to be rendered at the client device and/or storing, as an instance of the training data, the NL based input along with the LLM response that is selected from among the plurality of candidate LLM responses.

These and other implementations can optionally include one or more of the following features.

In some implementations, the method further can include: generating a plurality of critique responses based on comparing each of the plurality of candidate LLM responses to the set of response evaluation criteria using the LLM; determining which of the candidate LLM responses is most often determined to be the candidate LLM response which best complies with the set of response evaluation criteria in the plurality of critique responses. Selecting one of the plurality of candidate LLM responses as the LLM response can include selecting the candidate LLM response which is most often determined to best comply with the set of response evaluation criteria in the plurality of critique responses.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer readable storage media (e.g., transitory and/or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving natural language (NL) based input associated with a client device;

generating, using a large language model (LLM), an LLM response based on processing the NL based input, wherein generating the LLM response comprises:

obtaining a set of response evaluation criteria for evaluating a plurality of candidate LLM responses, wherein obtaining the set of response evaluation criteria for evaluating the plurality of candidate LLM responses comprises:

generating a request for the LLM to generate the set of response evaluation criteria based on the NL based input; and processing the request to generate the set of response evaluation criteria;

generating the plurality of candidate LLM responses based on processing the NL based input;

generating, for each of the plurality of candidate LLM responses, a corresponding critique response based on processing each of the plurality of candidate LLM responses and the set of response evaluation criteria using the LLM, wherein each of the corresponding critique responses are indicative of an extent to which a respective one of the plurality of candidate LLM responses complies with the set of response evaluation criteria, and wherein generating the corresponding critique response for a given candidate LLM response comprises:

generating a request for the LLM to determine which of the set of response evaluation criteria the given candidate LLM response complies with; and processing the request using the LLM to generate the corresponding critique response; and selecting, based on the corresponding critique response associated with one of the plurality of candidate LLM responses indicating a threshold compliance with the set of response evaluation criteria, the one of the plurality of candidate LLM responses as the LLM response; and causing the LLM response to be rendered at the client device.

2. The method of claim 1, wherein the indication of the extent to which the respective one of the plurality of candidate LLM responses complies with the set of response evaluation criteria comprises a comparison measure, the comparison measure being generated, for each of the plurality of candidate LLM responses, based on comparing each of the plurality of candidate LLM responses to the set of response evaluation criteria using the LLM.

3. The method of claim 1, wherein obtaining the set of response evaluation criteria further comprises:

obtaining user information associated with a user of the client device; and determining the set of response evaluation criteria based on the user information.

4. The method of claim 1, wherein obtaining the set of response evaluation criteria further comprises:

obtaining information indicative of a set of response evaluation criteria associated with a third party (3P); and determining the set of response evaluation criteria based on the obtained information.

5. A method implemented by one or more processors, the method comprising:

generating training data for fine-tuning a large language model (LLM), wherein generating the training data comprises:

obtaining a natural language (NL) based input for the LLM;

obtaining a set of response evaluation criteria for evaluating a plurality of candidate LLM responses, wherein obtaining the set of response evaluation criteria for evaluating the plurality of candidate LLM responses comprises:

generating a request for the LLM to generate the set of response evaluation criteria based on the NL based input; and processing the request to generate the set of response evaluation criteria;

generating the plurality of candidate LLM responses based on processing the NL based input;

generating, for each of the plurality of candidate LLM responses, a corresponding critique response based on processing each of the plurality of candidate LLM responses and the set of response evaluation criteria using the LLM, wherein each of the corresponding critique responses are indicative of an extent to which a respective one of the plurality of candidate LLM responses complies with the set of response evaluation criteria, and wherein generating the corresponding critique response for a given candidate LLM response comprises:

generating a request for the LLM to determine which of the set of response evaluation criteria the given candidate LLM response complies with; and processing the request using the LLM to generate the corresponding critique response; and selecting, based on the corresponding critique response associated with one of the plurality of candidate LLM responses indicating a threshold compliance with the set of response evaluation criteria, the one of the plurality of candidate LLM responses as an LLM response that is responsive to the NL based input; and storing, as an instance of the training data, the NL based input along with the LLM response that is selected from among the plurality of candidate LLM responses.

6. The method of claim 5, further comprising:

fine-tuning the LLM based on the training data.

7. The method of claim 6, further comprising:

generating, for each of the plurality of candidate LLM responses, and based on comparing each of the plurality of candidate LLM responses to the set of response evaluation criteria using the LLM, a corresponding comparison measure, and training a reward model based on the selected one of the plurality of candidate LLM responses and the corresponding comparison measure, wherein fine-tuning the LLM comprises fine-tuning the LLM with reinforcement learning (RL) using the reward model.

8. The method of claim 6, further comprising:

subsequent to fine-tuning the LLM:

receiving an NL based input associated with a client device;

generating an LLM response based on processing the NL based input associated with the client device using the LLM; and causing the LLM response to be rendered at the client device.

9. The method of claim 5, wherein the indication of the extent to which the respective one of the plurality of candidate LLM responses complies with the set of response evaluation criteria comprises a comparison measure, the comparison measure being generated, for each of the plurality of candidate LLM responses, based on comparing each of the plurality of candidate LLM responses to the set of response evaluation criteria using the LLM.

10. The method of claim 5, wherein obtaining the set of response evaluation criteria further comprises:

obtaining user information associated with a user of a client device; and determining the set of response evaluation criteria based on the user information.

11. The method of claim 5, wherein obtaining the set of response evaluation criteria further comprises:

obtaining information indicative of a set of response evaluation criteria associated with a third party (3P); and determining the set of response evaluation criteria based on the obtained information.

12. A system comprising:

at least one processor; and memory storing instructions that, when executed, cause the at least one processor to be operable to:

receive natural language (NL) based input associated with a client device;

generate, using a large language model (LLM), an LLM response based on processing the NL based input, wherein the instructions to generate the LLM response comprise instructions to:

obtain a set of response evaluation criteria for evaluating a plurality of candidate LLM responses, wherein the instructions to obtain the set of response evaluation criteria for evaluating the plurality of candidate LLM responses comprise instructions to:

generate a request for the LLM to generate the set of response evaluation criteria based on the NL based input; and process the request to generate the set of response evaluation criteria;

generate the plurality of candidate LLM responses based on processing the NL based input;

generate, for each of the plurality of candidate LLM responses, a corresponding critique response based on processing each of the plurality of candidate LLM responses and the set of response evaluation criteria using the LLM, wherein each of the corresponding critique responses are indicative of an extent to which a respective one of the plurality of candidate LLM responses complies with the set of response evaluation criteria, and wherein the instructions to generate the corresponding critique response for a given candidate LLM response comprise instructions to:

generate a request for the LLM to determine which of the set of response evaluation criteria the given candidate LLM response complies with; and process the request using the LLM to generate the corresponding critique response; and select, based on the corresponding critique response associated with one of the plurality of candidate LLM responses indicating a threshold compliance with the set of response evaluation criteria, the one of the plurality of candidate LLM responses as the LLM response; and cause the LLM response to be rendered at the client device.

13. The system of claim 12, wherein the indication of the extent to which the respective one of the plurality of candidate LLM responses complies with the set of response evaluation criteria comprises a comparison measure, the comparison measure being generated, for each of the plurality of candidate LLM responses, based on comparing each of the plurality of candidate LLM responses to the set of response evaluation criteria using the LLM.

14. The system of claim 12, wherein the instructions to obtain the set of response evaluation criteria further comprise instructions to:

obtain user information associated with a user of the client device; and determine the set of response evaluation criteria based on the user information.

15. The system of claim 12, wherein the instructions to obtain the set of response evaluation criteria further comprise instructions to:

obtain information indicative of a set of response evaluation criteria associated with a third party (3P); and determine the set of response evaluation criteria based on the obtained information.

16. The system of claim 12, wherein the instructions further cause the at least one processor to be operable to:

store, as an instance of training data, the NL based input along with the LLM response that is selected from among the plurality of candidate LLM responses; and fine-tune, based on the stored instance of the training data, the LLM.

* * * * *